United States Patent
Boyes et al.

(10) Patent No.: US 9,726,234 B2
(45) Date of Patent: Aug. 8, 2017

(54) CLUTCH ASSEMBLY

(71) Applicant: LITENS AUTOMOTIVE PARTNERSHIP, Woodbridge (CA)

(72) Inventors: Andrew M. Boyes, Aurora (CA); Jason R. Desouza-Coelho, Markham (CA); Zbyslaw Staniewicz, Mississauga (CA); Bashar Yazigi, Woodbridge (CA)

(73) Assignee: Litens Automotive Partnership, Woodbridge, Ontario (CA)

(*) Notice: Subject to any disclaimer, the term of this patent is extended or adjusted under 35 U.S.C. 154(b) by 94 days.

(21) Appl. No.: 14/391,924

(22) PCT Filed: Apr. 10, 2013

(86) PCT No.: PCT/CA2013/000345
§ 371 (c)(1),
(2) Date: Oct. 10, 2014

(87) PCT Pub. No.: WO2013/152430
PCT Pub. Date: Oct. 17, 2013

(65) Prior Publication Data
US 2015/0041277 A1    Feb. 12, 2015

Related U.S. Application Data

(60) Provisional application No. 61/622,501, filed on Apr. 10, 2012.

(51) Int. Cl.
*F16D 27/105* (2006.01)
*F16D 27/14* (2006.01)
(Continued)

(52) U.S. Cl.
CPC .............. *F16D 27/14* (2013.01); *B60K 25/02* (2013.01); *F16D 13/10* (2013.01); *F16D 13/12* (2013.01); *F16D 13/76* (2013.01); *F16D 27/105* (2013.01)

(58) Field of Classification Search
None
See application file for complete search history.

(56) References Cited

U.S. PATENT DOCUMENTS 2,975,648 A   3/1961   Doerries
3,019,871 A   2/1962   Sauzedde
(Continued)

FOREIGN PATENT DOCUMENTS

CN   1490536   4/2004
CN   101140017   3/2008
(Continued)

OTHER PUBLICATIONS

Warner Electric-Wrap Spring Clutch Catalog (p. 1310), Jul. 1, 2011, Warner Electric.
(Continued)

*Primary Examiner* — Robert A Siconolfi
*Assistant Examiner* — Ryan Dodd
(74) *Attorney, Agent, or Firm* — Millman IP Inc.

(57) ABSTRACT

In an aspect, a clutch assembly is provided that uses an electromagnet to generate a magnetic circuit which drives an armature to a position whereat it engages the clutch to operatively connect a rotating member to a stationary member. In embodiments wherein the armature initially rotates with the rotating member, the magnetic circuit passes through the stationary member. In embodiments wherein the armature is initially stationary, the magnetic circuit extends through the rotating member.

13 Claims, 31 Drawing Sheets

(51) Int. Cl.
*B60K 25/02* (2006.01)
*F16D 13/12* (2006.01)
*F16D 13/76* (2006.01)
*F16D 13/10* (2006.01)

(56) References Cited

U.S. PATENT DOCUMENTS

| | | | |
|---|---|---|---|
| 3,637,056 A | | 1/1972 | Baer |
| 3,865,222 A | | 2/1975 | Briar |
| 3,905,458 A | | 9/1975 | Mehrbrodt |
| 4,201,281 A | | 5/1980 | Macdonald |
| 4,263,995 A | | 4/1981 | Wahlstedt |
| 4,273,226 A | * | 6/1981 | Takefuta ............... F16D 27/105 192/30 V |
| 5,687,822 A | * | 11/1997 | Arai ............... F16D 27/105 192/81 C |
| 5,722,909 A | | 3/1998 | Thomey |
| 6,083,130 A | | 7/2000 | Mevissen et al. |
| 6,138,808 A | * | 10/2000 | Wussow ............... F16D 27/105 192/48.2 |
| 7,007,780 B2 | | 3/2006 | Arnold et al. |
| 7,153,227 B2 | | 12/2006 | Dell et al. |
| 7,207,910 B2 | | 4/2007 | Dell et al. |
| 7,591,357 B2 | | 9/2009 | Antchak et al. |
| 7,618,337 B2 | | 11/2009 | Jansen et al. |
| 7,624,852 B2 | | 12/2009 | Mevissen et al. |
| 7,708,661 B2 | | 5/2010 | Pflug et al. |
| 7,712,592 B2 | | 5/2010 | Jansen et al. |
| 7,985,150 B2 | | 7/2011 | Kamdem |
| 8,387,767 B2 | | 3/2013 | Komorowski et al. |
| 9,097,229 B2 | * | 8/2015 | Antchak ............... F02N 15/022 |
| 2004/0020737 A1 | | 2/2004 | Webber |
| 2005/0230210 A1 | | 10/2005 | Arnold et al. |
| 2006/0240926 A1 | | 10/2006 | Wiesneth et al. |
| 2007/0181399 A1 | * | 8/2007 | Ackermann .......... F16D 27/105 192/81 C |
| 2008/0041686 A1 | | 2/2008 | Hoshino et al. |
| 2010/0038203 A1 | | 2/2010 | Wheals |
| 2010/0122882 A1 | | 5/2010 | Komorowski et al. |
| 2010/0230227 A1 | * | 9/2010 | Parsons ............... B60K 25/02 192/65 |
| 2013/0081588 A1 | * | 4/2013 | Antchak ............... F02N 15/022 123/179.1 |

FOREIGN PATENT DOCUMENTS

| | | |
|---|---|---|
| DE | 10037942 A1 | 3/2001 |
| DE | 10350698 A1 | 6/2004 |
| EP | 1764524 A1 | 3/2007 |
| EP | 1887224 | 2/2008 |
| GB | 1480676 A | 7/1977 |
| JP | 2059328 | 4/1990 |
| JP | 06159393 A | 6/1994 |
| WO | 03104673 A1 | 12/2003 |
| WO | 2008044058 A1 | 4/2008 |
| WO | 2009118834 A1 | 10/2009 |
| WO | 2010048732 A1 | 5/2010 |
| WO | 2010054487 A1 | 5/2010 |
| WO | 2010099605 | 9/2010 |
| WO | 2010099605 A1 | 9/2010 |
| WO | 2011072391 A1 | 12/2010 |
| WO | 2012024790 A2 | 3/2012 |
| WO | 2012135942 A1 | 10/2012 |
| WO | 2012139224 A1 | 10/2012 |
| WO | 2012024790 A3 | 11/2012 |

OTHER PUBLICATIONS

Texas Instruments—InstaSPIN BLDC Motor Control Lab, Nov. 1, 2011, Texas Instruments.
International Search Report and Written Opinion for PCT/CA2013/000345, Jul. 19, 2013, ISA.
International Preliminary Report on Patentability for PCT/CA2013/000345, Oct. 23, 2014, ISA.
Borg Warner Transmission Group Clutch Bearing Designs, Unknown, Borg Warner Inc.
Applimotion UTS—12VDC Frameless Ring Motors, 2014, Applimotion Inc.
CN201280049474.4 Office Action and search report dated Sep. 24, 2015.
CN201280049474.4 English translation of search report dated Sep. 24, 2015.
CN201280049474.4 English translation of Office Action dated Sep. 24, 2015.
Extended European Search Report for EP12838370 dated Jun. 10, 2016.
International Preliminary Report on Patentability for PC/CA2012/000916, Apr. 17, 2014.
Launchpoint-Halbach-Array-Motor.
Search Report and Written Opinion for PCT/CA2012/000916, Jan. 28, 2013.

* cited by examiner

FORCE VS. AMP-TURNS

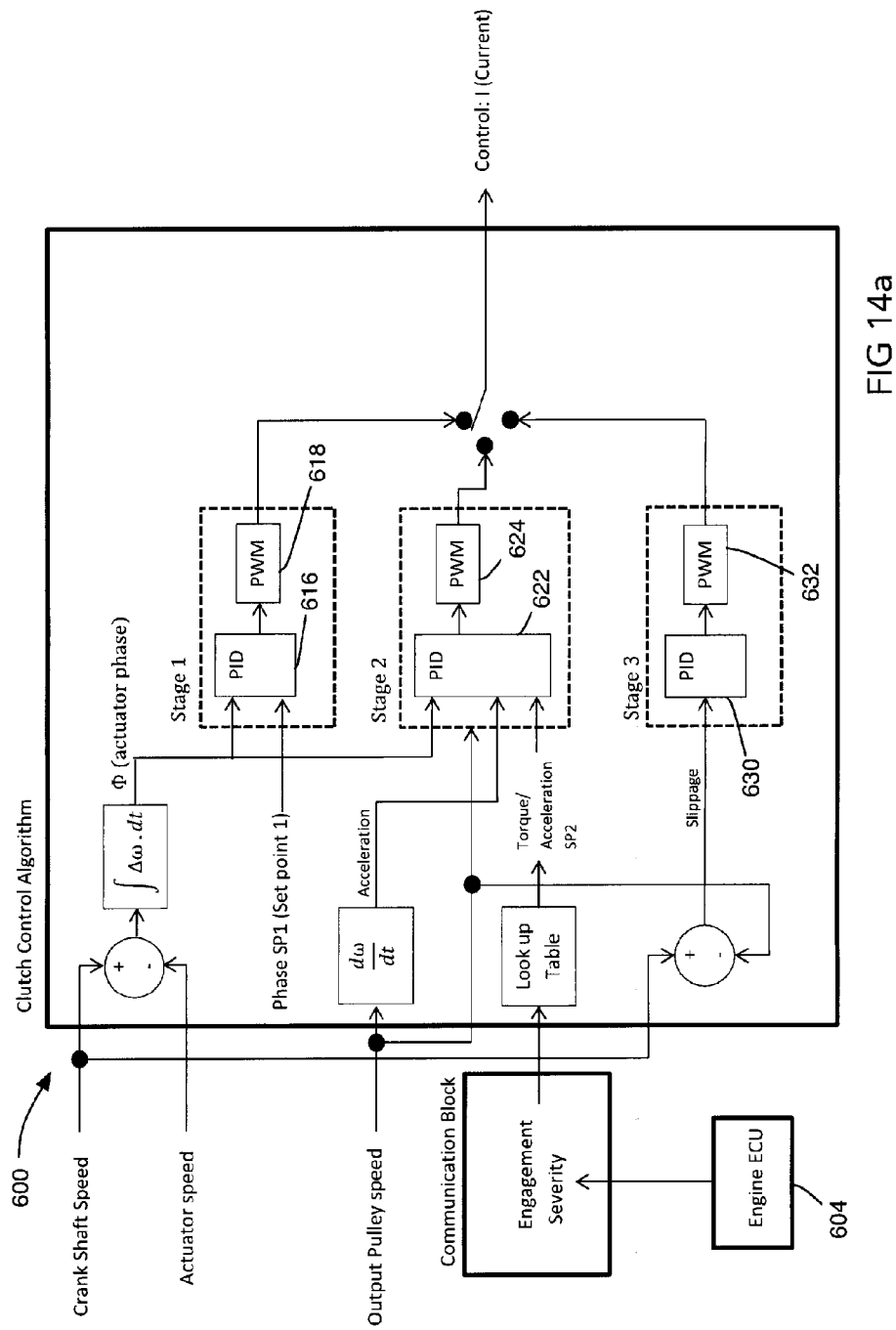

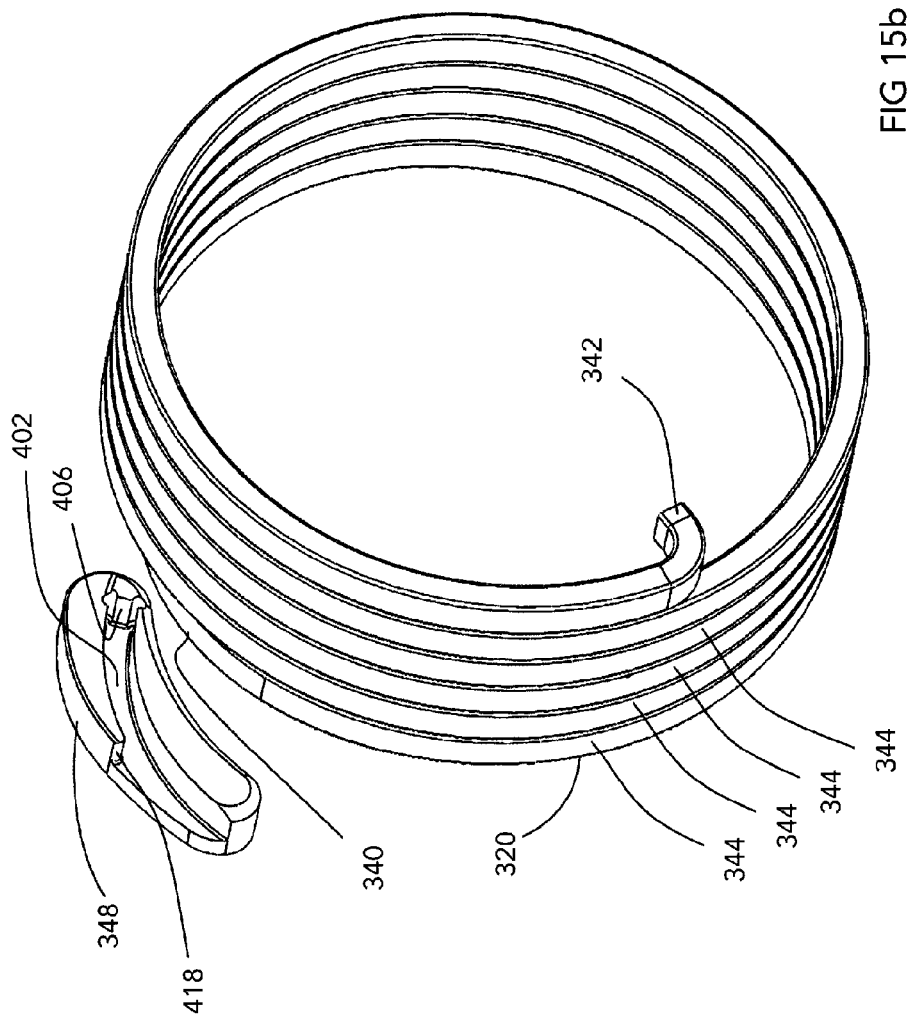

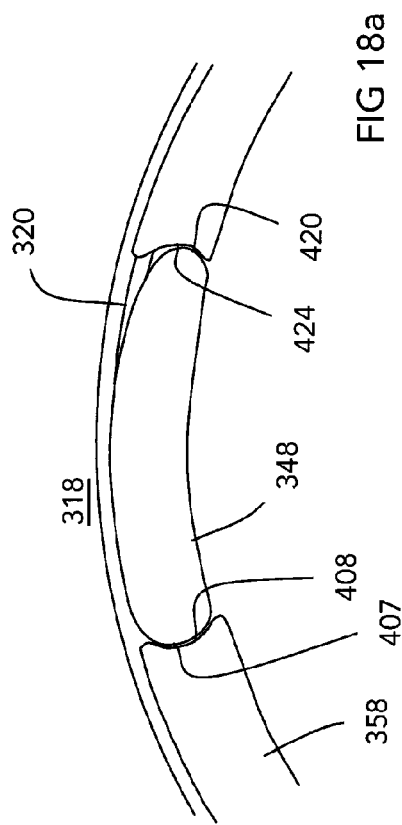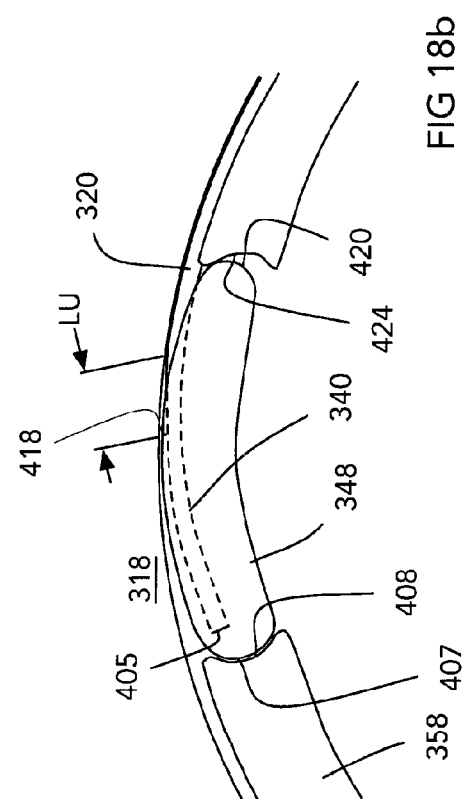

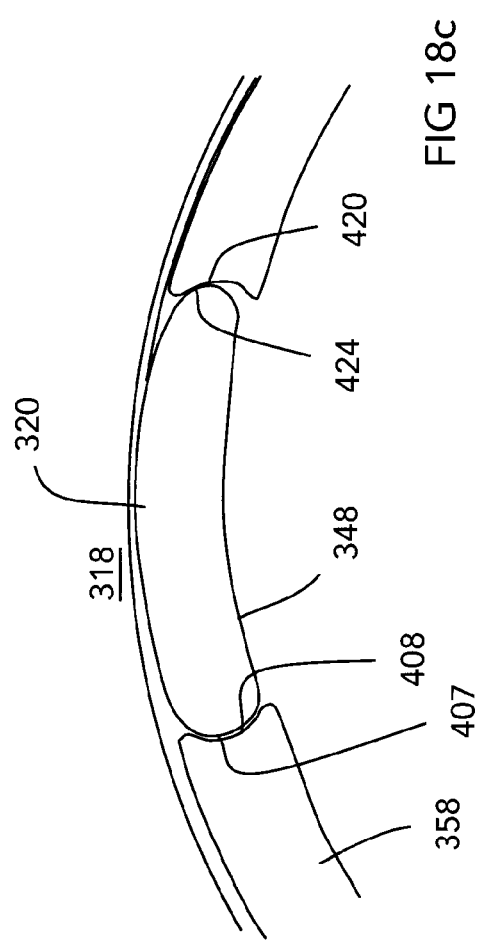

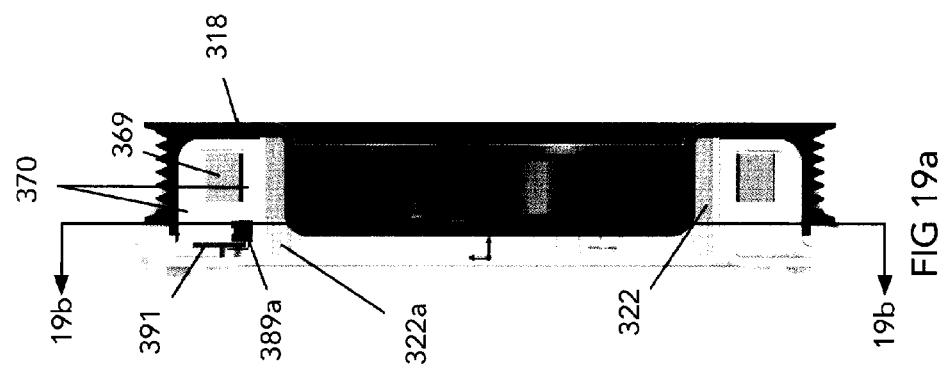
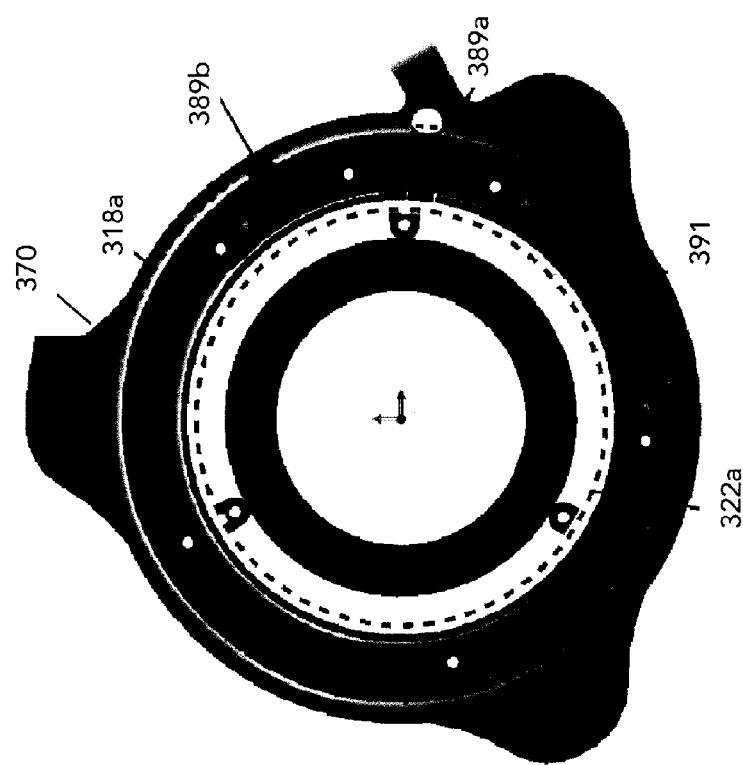

CLUTCH ASSEMBLY

CROSS-REFERENCE TO RELATED APPLICATIONS

This application claims the benefit of U.S. Provisional Patent Applications No. 61/622,501, filed Apr. 10, 2012, the contents of which are incorporated by reference as if fully set forth in detail herein.

FIELD

The present disclosure relates to drive systems for transferring power from an output shaft of an engine to an input shaft of a load, and more particularly to such loads as a supercharger, an alternator, a cooling fan, a power steering pump, an air-conditioning compressor, a vacuum pump, an air compressor, a hydraulic motor, a power take off, a secondary electrical generator or any other suitable kind of load.

BACKGROUND

Clutches are useful devices for controlling the operative connection between a drive element, such as an engine crankshaft in a vehicle, with a driven element, such as an accessory in the vehicle, such as, for example, a supercharger, an alternator or any other suitable accessory. However, many clutches currently suffer from a number of problems. Some clutches require a significant amount of power to operate unfortunately, and therefore require electrical cable that is capable of carrying high currents, as well as relays and the like, which add to the cost associated with such clutches, aside from their large power draw.

Some clutches which have a lower power draw still require many components even though they do not require relays, high-current electrical cable and the like.

Some clutches are very sensitive to the gaps between certain components and are consequently very difficult to install, requiring careful shimming of components during their installation to ensure that gaps between components are maintained.

It would be beneficial to provide a clutch that at least partially addresses one or more of these issues.

SUMMARY

In an aspect, a clutch assembly is provided that uses an electromagnet to generate a magnetic circuit which drives an armature to a position whereat it engages the clutch to operatively connect a rotating member to a stationary member. In embodiments wherein the armature initially rotates with the rotating member, the magnetic circuit passes through the stationary member. In embodiments wherein the armature is initially stationary, the magnetic circuit extends through the rotating member.

In an embodiment, the clutch assembly includes a wrap spring having a first end, a second end and a plurality of helical coils between the first end and the second end. One of the first and second clutch members is rotationally operatively connected with the first end of the wrap spring. An armature is provided and is rotationally operatively connected to the second end of the wrap spring. An electromagnetic unit is provided and includes an electromagnet. Energization of the electromagnet generates a magnetic flux that flows through one of the first and second clutch members, through the armature and back into the electromagnetic unit. When the first clutch member is rotating and the second clutch member is stationary, the magnetic flux draws the armature axially into engagement with the other of the first and second clutch members with sufficient force to frictionally cause rotation of the armature and the second end of the wrap spring relative to the first end of the wrap spring so as to radially expand the wrap spring into engagement with the other of the first and second clutch members thereby operatively connecting the first clutch member to the second clutch member.

In an embodiment, the clutch assembly includes a first clutch member that is rotatable about an axis, a second clutch member that is rotatable about the axis, a wrap spring, an armature and an electromagnetic unit. The wrap spring has a first end, a second end and a plurality of helical coils between the first end and the second end. The first clutch member is rotationally operatively connected with the first end of the wrap spring. The armature is rotationally operatively connected to the second end of the wrap spring. The first clutch member is rotationally operatively connected to the armature. The electromagnetic unit includes an electromagnet. Energization of the electromagnet generates a magnetic flux that flows through the second clutch member, through the armature and back into the electromagnetic unit. When the first clutch member is rotating and the second clutch member is stationary, the magnetic flux draws the armature axially into engagement with the second clutch member with sufficient force to frictionally retard the armature and the second end of the wrap spring relative to the first end of the wrap spring so as to radially expand the wrap spring into engagement with the second clutch member thereby operatively connecting the first clutch member to the second clutch member.

In another embodiment, the clutch assembly includes a first clutch member that is rotatable about an axis, a second clutch member that is rotatable about the axis, a wrap spring, an armature and an electromagnetic unit. The wrap spring has a first end, a second end and a plurality of helical coils between the first end and the second end. The first end is rotationally operatively connected with the second clutch member. The armature is rotationally operatively connected to the second end of the wrap spring. The electromagnetic unit includes an electromagnet. Energization of the electromagnet generates a magnetic circuit that transports a magnetic flux through the first clutch member, through the armature and back into the electromagnetic unit. When the first clutch member is rotating and the second clutch member is stationary, the magnetic flux draws the armature axially into engagement with the first clutch member with sufficient force to frictionally drive the armature and the second end of the wrap spring rotationally about the axis relative to the first end of the wrap spring so as to radially expand the wrap spring into engagement with the first clutch member thereby operatively connecting the first clutch member to the second clutch member.

In another aspect, a clutch assembly is provided that includes a first clutch member that is rotatable about an axis, a second clutch member that is rotatable about the axis, a wrap spring and a wrap spring engagement drive structure. The wrap spring has a first end, a second end and a plurality of helical coils between the first end and the second end. The first clutch member is rotationally operatively connected with the first end of the wrap spring. The wrap spring engagement drive structure is rotationally operatively connected with the second end of the wrap spring. Movement of the wrap spring engagement drive structure from a disengaged position wherein the wrap spring is unengaged with the second clutch portion to an engaged position wherein the wrap spring engagement drive structure drives the second end of the wrap spring rotationally relative to the first end of the wrap spring to expand the wrap spring into engagement with the second clutch member to operatively connect the first clutch member to the second clutch member. When the wrap spring engagement drive structure is in the disengagement position, the wrap spring is wrapped around a wrap spring support surface that has a radius that is larger than a free state radius of the wrap spring, so as to generate a selected amount of preload into the wrap spring.

In another aspect, a clutch assembly is provided that includes a first clutch member that is rotatable about an axis, a second clutch member that is rotatable about the axis, a wrap spring and a wrap spring engagement drive structure. The wrap spring has a first end, a second end and a plurality of helical coils between the first end and the second end. A wrap spring engagement drive structure is provided that is rotationally operatively connected with the second end of the wrap spring. Movement of the wrap spring engagement drive structure from a disengaged position wherein the wrap spring is unengaged with the second clutch portion to an engaged position wherein the wrap spring engagement drive structure drives the second end of the wrap spring rotationally relative to the first end of the wrap spring to expand the wrap spring into engagement with the second clutch member to operatively connect the first clutch member to the second clutch member. When the wrap spring engagement drive structure is in the disengagement position, the wrap spring is wrapped around a wrap spring support surface that has a radius that is larger than a free state radius of the wrap spring, so as to generate a selected amount of preload into the wrap spring.

In yet another aspect, a combination of a wrap spring and a carrier is provided. The wrap spring has a first end and a second end and a plurality of coils between the first and second ends. The carrier includes a slot sized to receive the first end of the wrap spring, wherein the carrier includes a drive wall at an end of the slot which is abutted by a helical end face at the first end of the wrap spring. The carrier has a torque transfer surface configured to transfer a torque from the first end of the wrap spring into another component. The torque transfer surface has a greater surface area than the helical end face at the first end of the wrap spring.

In some embodiments, the torque transfer surface is arcuate so as to be pivotable within a complementary arcuate torque transfer surface of a component that is engaged by the carrier.

In yet another aspect, a combination of a wrap spring and a carrier is provided. The wrap spring has a first end and a second end and a plurality of coils between the first and second ends. The carrier includes a slot sized to receive the first end of the wrap spring. The carrier includes a drive wall at an end of the slot which is abutted by a helical end face at the first end of the wrap spring. The carrier has a torque transfer surface configured to transfer a torque from the first end of the wrap spring into another component. The torque transfer surface is arcuate so as to be pivotable within a complementary arcuate torque transfer surface of a component that is engaged by the carrier.

In another aspect, a clutch assembly is provided that includes a first clutch member that is rotatable about an axis, a second clutch member that is rotatable about the axis, a wrap spring and a carrier. The wrap spring has a first end, a second end and a plurality of helical coils between the first end and the second end. The carrier includes a slot sized to receive the first end of the wrap spring. The carrier includes a drive wall at an end of the slot which is abutted by a helical end face at the first end of the wrap spring. The carrier has a torque transfer surface configured to transfer a torque from the first end of the wrap spring into another component. The torque transfer surface is arcuate so as to be pivotable within a complementary arcuate torque transfer surface associated with the first clutch member.

In some embodiments, the torque transfer surface on the carrier has a surface area that is larger than a surface area of the helical end face at the first end of the wrap spring.

In some embodiments, the wrap spring is urged to expand radially and pivot the carrier in a first direction during torque transfer from the first clutch member into the wrap spring through the carrier. The carrier further includes a guide surface that is engageable with a corresponding guide surface associated with the first clutch member when torque is not transferred from the first clutch member into the wrap spring, so as to urge pivoting of the carrier in a second direction corresponding to radial contraction of the wrap spring.

In another aspect, a clutch assembly is provided that uses an electromagnet to generate a magnetic circuit which drives an armature to a position whereat it engages the clutch to operatively connect a rotating member to a stationary member. In embodiments wherein the armature initially rotates with the rotating member, the magnetic circuit passes through the stationary member. In embodiments wherein the armature is initially stationary, the magnetic circuit extends through the rotating member. The armature has a size that is selected to permit the armature to become magnetically saturated at a selected voltage and at a selected temperature, so that the magnetic force exerted between the member that has the magnetic circuit passing through it and the armature is substantially constant over a selected range of temperatures and voltages.

In yet another aspect, a clutch assembly is provided that uses an electromagnet to generate a magnetic circuit which drives an armature to a position whereat it engages the clutch to operatively connect a rotating member to a stationary member. In embodiments wherein the armature initially rotates with the rotating member, the magnetic circuit passes through the stationary member. In embodiments wherein the armature is initially stationary, the magnetic circuit extends through the rotating member. The armature has a friction engagement surface that is frictionally engageable with the member that has the magnetic circuit passing through it, and a flux transfer surface through which the magnetic flux travels from the member that has the magnetic circuit passing through it to the armature to draw the armature into engagement with the member that has the magnetic circuit passing through it. The friction engagement surface has a surface area that is selected to limit the frictional force between the member that has the magnetic circuit passing through it and the armature. The flux transfer surface is selected to provide a selected area of contact between the armature and the member that has the magnetic circuit passing through it. The armature has a cross-sectional surface area at an axial distance from the flux transfer surface that is smaller than the surface area of the flux transfer surface and is selected to control the saturation limit for magnetization of the armature during energization of the electromagnet. In some embodiments, the flux transfer surface is the same surface as the friction engagement surface.

BRIEF DESCRIPTION OF THE DRAWINGS

The present disclosure will now be described, by way of example only, with reference to the attached drawings, in which:

FIGS. 14a and 14b are diagrams illustrating a method of controlling the clutch assembly shown in FIGS. 11a and 11b;

FIGS. 15a and 15b perspective views of a wrap spring and a carrier for the clutch assembly shown in FIGS. 11a and 11b;

FIGS. 18a-18c illustrate operation of a carrier for the wrap spring;

FIG. 19a is another sectional side view of the clutch assembly shown in FIGS. 11a and 11b; and FIG. 19b is a sectional elevation view of the clutch assembly taken along section line 19b-19b in FIG. 19a.

DETAILED DESCRIPTION

Figure 1:
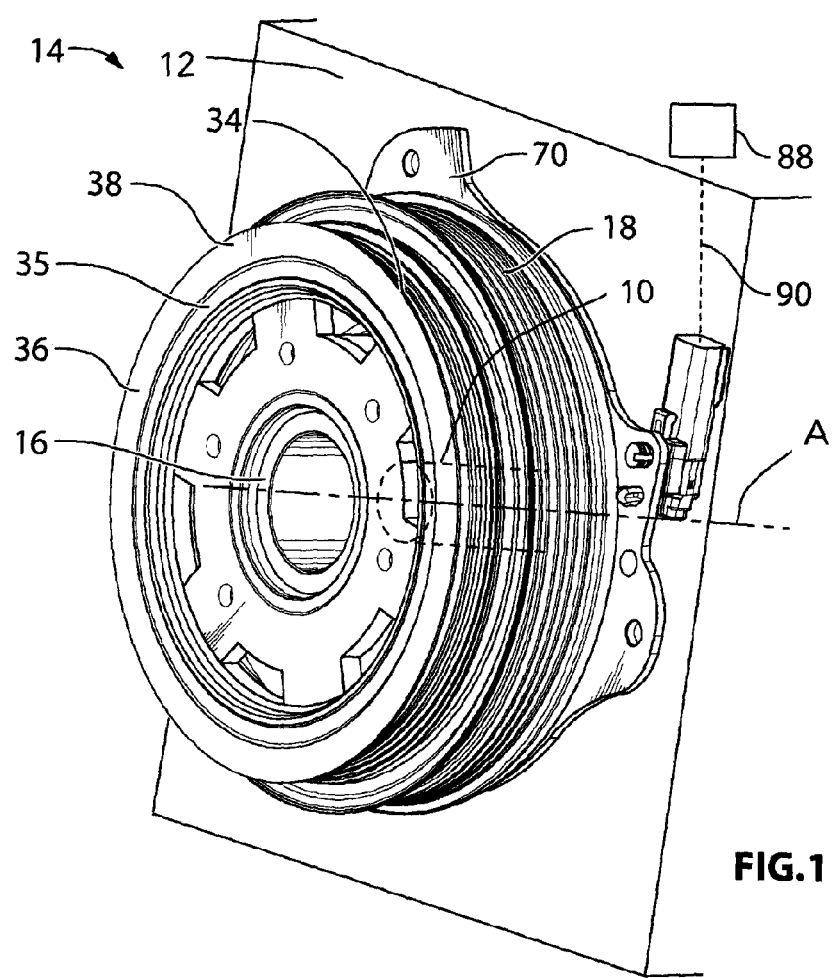
FIG. 1 is a side view of a clutch assembly in accordance with an embodiment of the invention.

Reference is made to FIG. 1, which shows an engine crankshaft 10 of an internal combustion engine 12 (represented for convenience by lines defining a rectangular volume). The crankshaft 10 is rotatable about an axis A. A clutch assembly 14 (which may also be referred to as a clutch 14) is mounted to the crankshaft 10 and is operable to selectively connect the crankshaft 10 to a selected accessory (not shown). The accessory may be any suitable accessory, such as, for example, a supercharger, an alternator, a water pump, a fan, an air conditioning compressor, a power steering pump, a vacuum pump, an air compressor, a hydraulic motor, a power take off or a secondary electrical generator.

Figure 2A:
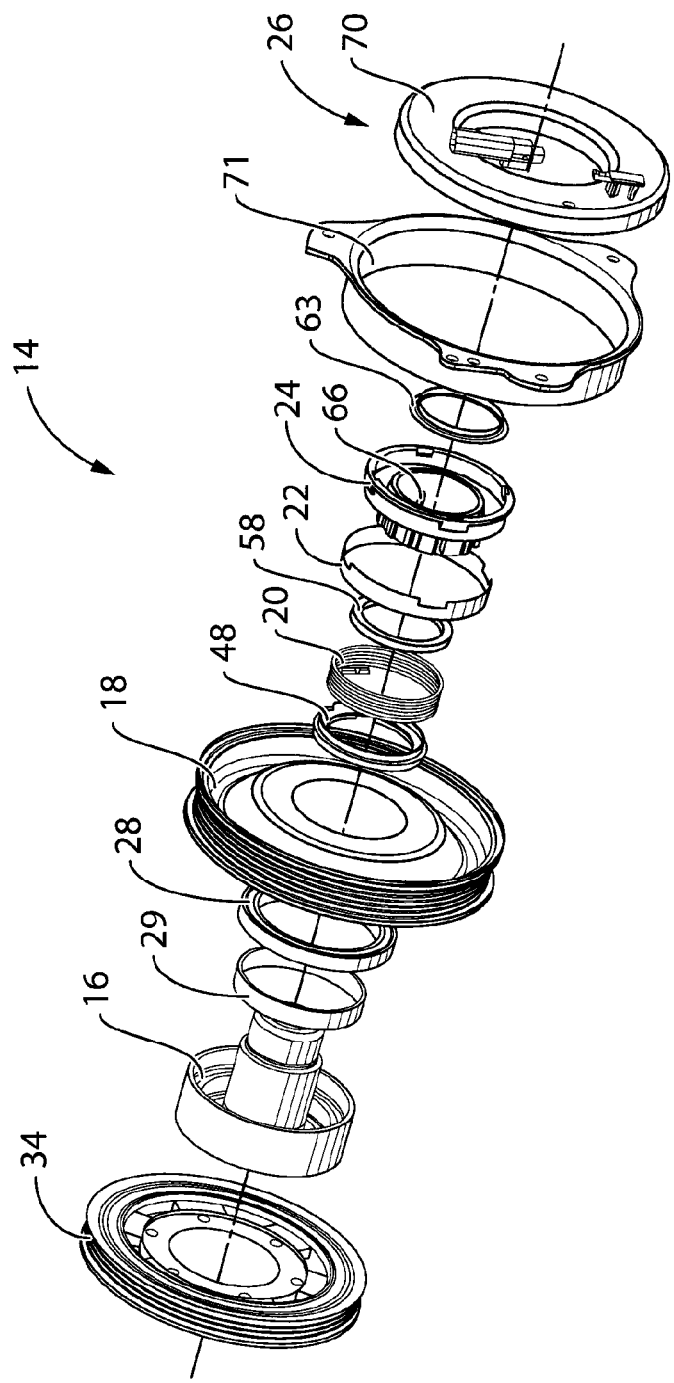
FIG. 2a is a perspective exploded view of the clutch assembly shown in FIG. 1.
Figure 2B:
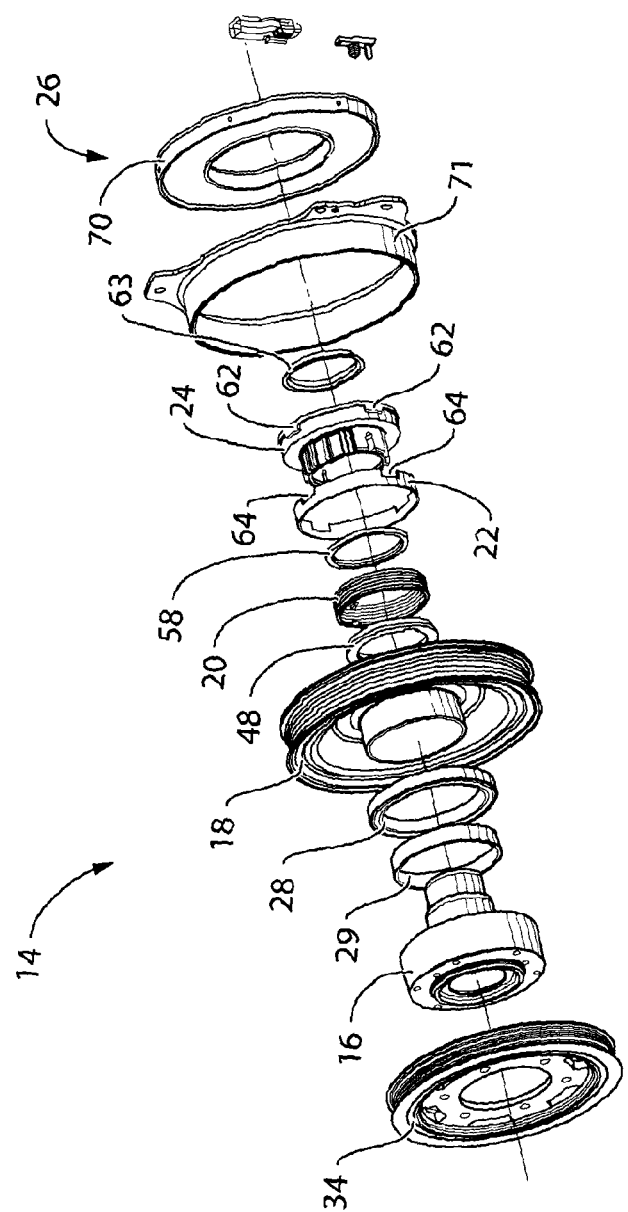
FIG. 2b is another perspective exploded view of the clutch assembly shown in FIG. 1.

Referring to FIGS. 2a and 2b, the clutch assembly 14 includes a first clutch member 16 and a second clutch member 18 that are both rotatable about the axis A, a wrap spring 20, an armature 22, an actuator 24 and an electromagnetic unit 26. The clutch assembly 14 can be constructed from relatively few components, and is usable to selectively connect the crankshaft 10 to the accessory using very low power.

Figure 3A:
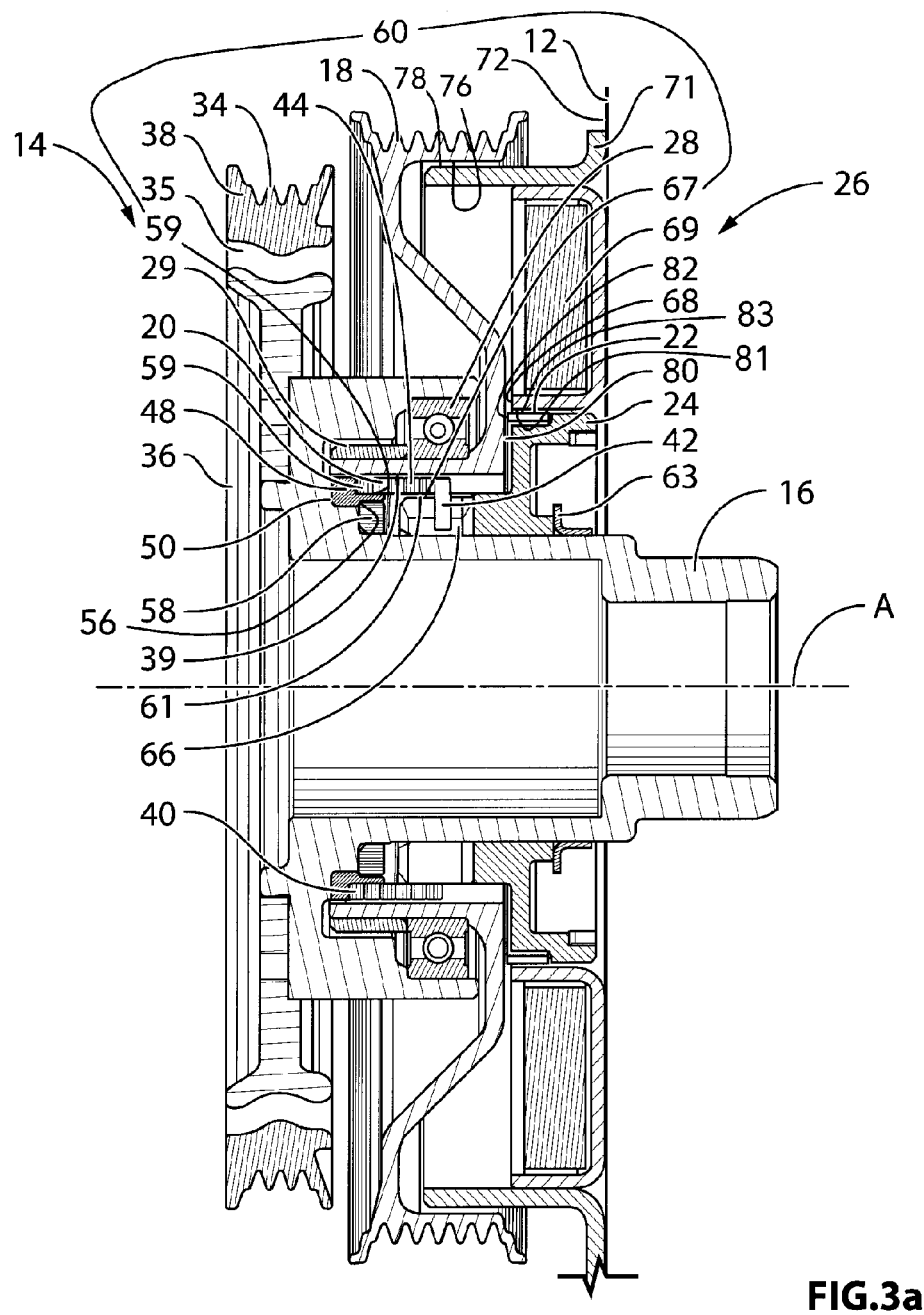
FIGS. 3a and 3b are sectional side views of the clutch assembly shown in FIG. 1, in disengaged and engaged positions respectively.
Figure 3B:
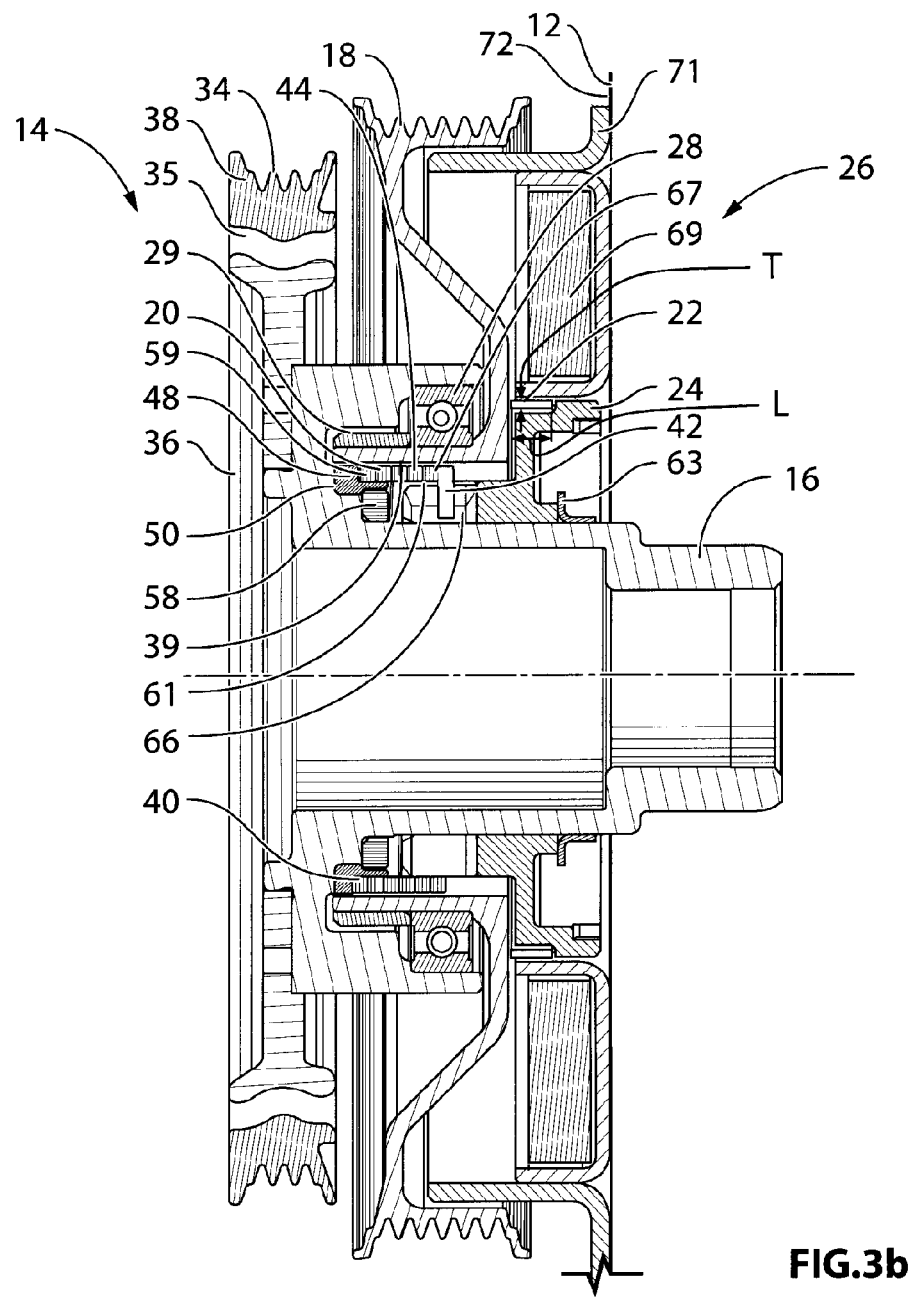

The clutch assembly 14 is movable from a disengaged position shown in FIG. 3a to an engaged position shown in FIG. 3b by transmission of a magnetic flux from the electromagnetic unit 26 through the second clutch member 18, the armature 22 and back into the electromagnetic unit 26. The clutch assembly 14 may be referred to as being engaged when it in the engaged position and may be referred to as being disengaged or unengaged when it is in the disengaged position.

The first clutch member 16 is driven by the crankshaft 10 and in the embodiment shown in FIG. 1 it mounts to the crankshaft 10. The first clutch member 16 may be made from any suitable material, such as a suitable steel.

The second clutch member 18 is driven by the first clutch member 16 when the clutch 14 is engaged (FIG. 3b), and may be idle when the clutch 14 is disengaged (FIG. 3a). The second clutch member 18 may be rotatably supported on the first clutch member 16 by means of one or more bearing members 28. In the embodiment shown there is a single bearing member 28 provided, which is a ball bearing, which is held on the second clutch member 18 by means of a bearing retainer 29 that is fixedly mounted to the second clutch member 18 (e.g. by way of a press-fit).

The second clutch member 18 may be configured to transfer power from the crankshaft 10 to the accessory in any suitable way. For example, in the embodiment shown in FIG. 1, the second clutch member 18 is a pulley 32 that is configured to engage a belt (not shown) that engages a pulley on the input shaft of the accessory. In alternative embodiments however, the second clutch member 18 may be some other suitable power transfer element such as a gear that engages one or more gears that ultimately drive the accessory, a sprocket that drives a chain or the like that ultimately drives the accessory.

The second clutch member 18 may be made from material that has at least a selected permeability so that it has at least a selected capability to transfer a magnetic flux, such as a 1010 steel. It will be noted that it is not important for the first clutch member 16 to be made from a material having a particularly high magnetic permeability, or a particularly low magnetic permeability. The magnetic permeability of the first clutch member 16 is not important, at least in the embodiment shown in FIG. 1.

The first clutch member 16 may optionally have a means for driving other accessories that are separate from the accessory. For example, in an embodiment wherein the accessory is a supercharger, the first clutch member 16 may be configured to drive accessories such as an alternator, a water pump, an air conditioning compressor, a power steering pump, a fan, a power steering pump, a vacuum pump, an air compressor, a hydraulic motor, a power take off or a secondary electrical generator, separately from the accessory that is driven from the second clutch member 18. The means for driving these other accessories may be provided by a second pulley 34 or some other suitable power transfer member that is mounted to the first clutch member 16 separately from the second clutch member 18. In such embodiments, as shown in FIG. 1, the second clutch member 18 may be referred to a first power transfer member for driving one or more first accessories, and the second pulley 34 may be referred to as a second power transfer member for driving one or more second accessories.

This second pulley 34 may include a means for damping torsional vibration that may be generated at the crankshaft 10 (a by-product of the operation of many, if not all, internal combustion engines). For example, the second pulley 34 may include a rubber damping element 35 therein, between an inner portion 36 of the pulley 34 and an outer portion 38 of the pulley 34. In some embodiments, the second pulley 34 may be replaced by a torsional vibration damping disc that is not intended to drive any components, but is there only to dampen torsional vibrations from the engine 12.

The wrap spring 20 is movable between a disengaged position shown in FIG. 3a and an engaged position shown in FIG. 3b. In the disengaged position the wrap spring 20 is unengaged with the second clutch member 18 and first clutch member 16 is operatively disconnected with the second clutch member 18 (i.e the clutch 14 is disengaged). In the engaged position the wrap spring 20 is radially expanded into engagement with a radially inner surface shown at 39 of the second clutch member 18 (i.e. the clutch 14 is engaged).

Figure 4A:
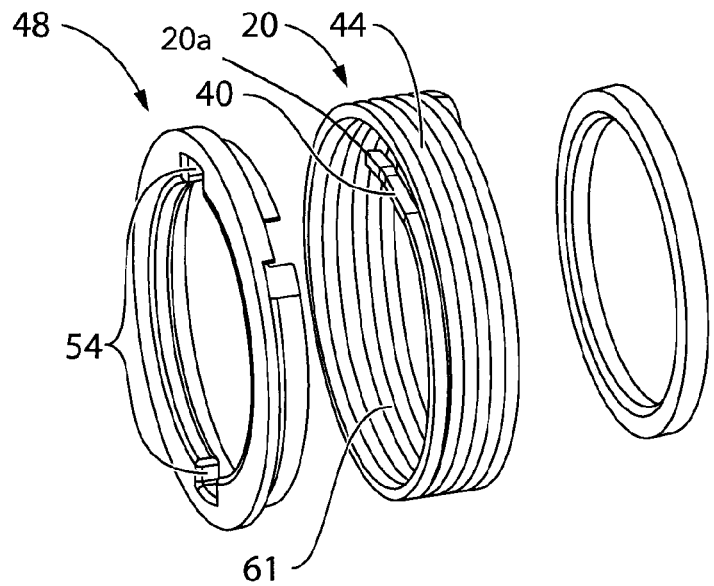
FIGS. 4a, 4b and 4c are magnified perspective exploded views of portions of the clutch assembly shown in FIG. 1.

The wrap spring 20 has a first end 40 (shown best in FIG. 4a), a second end 42 (shown best in FIG. 4b) and a plurality of helical coils 44 between the first end 40 and the second end 42. The first clutch member 16 is engaged with the first end 40 of the wrap spring 20 via engagement of a lug 52 (FIG. 4c) with the helical end face of the first end of the wrap spring 20. The first end 40 of the wrap spring 20 may be held in a groove 46 (FIG. 4b) in a carrier shown at 48.

The carrier 48 in general assists in maintaining a predetermined shape to the wrap spring 20, and assists the wrap spring 20 in resisting undesired deformation particularly during periods in which the wrap spring 20 is transferring high torque from the first clutch member 16 to the second clutch member 18.

The carrier 48 may be made any suitable material, such as a plastic material, or alternatively a metallic material.

Referring to FIG. 3a, the carrier 48 is held in a carrier seat 50 in the first clutch member 16. The carrier 48 is driven rotationally about the axis A by the first clutch member 16 by means of engagement between a plurality of lugs 52 (shown in FIG. 4c) on the first clutch member 16 and a plurality of lug slots 54 (FIG. 4a) on the carrier 48. While two lugs 52 and two lug slots 54 are shown, in some embodiments a single lug 52 and a single lug slot 54 could be provided, or three or more lugs 52 and lug slots 54 could be provided. Instead of providing lugs 52 on the first clutch member 16 and lug slots 54 on the carrier 48, the lugs 52 could be on the carrier 48 and the lug slots 54 could be on the first clutch member 16.

The carrier 48 further includes a retainer engagement surface 56 (FIG. 3a). A retainer 58 that is press-fit onto the first clutch member 16 engages the retainer engagement surface 56 and holds the carrier 48 in place against the carrier seat 50.

Figure 4B:
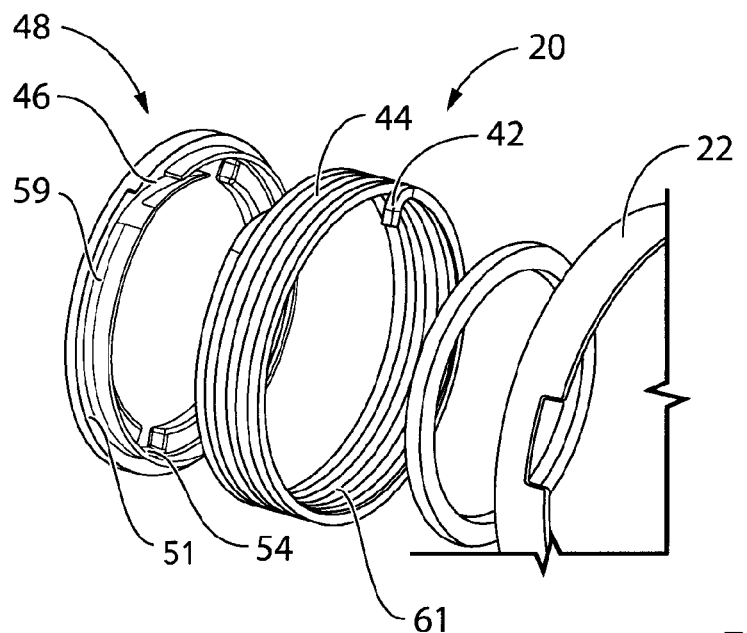

Referring to FIG. 4b, the carrier 48 further includes a wrap spring seat 51 on which the wrap spring 20 rests. The wrap spring seat 51 terminates in the groove 46. The groove 46 ends at one of the lug slots 54. When lugs 52 (FIG. 4c) are positioned in the lug slots 54 the first end 40 of the wrap spring 20 directly engages one of the lugs 52. As a result, the first clutch member 16 does not drive the wrap spring 20 through the carrier 48, but instead drives the first end 40 of the wrap spring 20 directly. This is advantageous in that the helical end face 20a of the first end 40 of the wrap spring 20 directly abuts (and is driven by) a metallic surface (i.e. the lug 52) instead of abutting material from the carrier 48, which may be softer than the material of the first clutch member 16 and which could be deformed by the helical end face 20a if it were present between the end face 20a and the lug 52 during periods of high torque transfer.

The carrier 48 further includes a first portion 59 of a wrap spring support surface 60 that extends axially. The first portion 59 of the surface 60 supports a portion of the radially inner surface (shown at 61) of the wrap spring 20 (FIG. 3a).

The actuator 24 may be made from a material that can slide against the material of the first clutch member 16 and is mounted on the first clutch member 16 so as to be rotational slidable thereon. For example, the actuator 24 may be made from a polymeric material that can slip relative to the material of the first clutch member 16 (which may be metallic).

An actuator retainer 63 is fixedly mounted to the first clutch member 16 to prevent axial movement beyond a selected axial distance relative to the second clutch member 18. In an embodiment, the actuator 24 may be made from a material that is at least in some embodiments non-magnetic, such as Nylon 4-6 that is modified to include Teflon™, or alternatively aluminum (which may be pure aluminum or an aluminum alloy). The actuator 24 supports the armature 22 in such a way that the armature 22 is movable axially thereon but such that the armature 22 is rotationally operatively connected to the actuator 24. For greater certainty, when a first object is 'rotationally operatively connected' to or with a second object, this means that the first object is capable of causing rotation in the second object, without limitation on whether or not the first object is capable of causing axial movement in the second object. Depending on how they are connected, the second object may also be capable of causing rotation in the first object; configurations where this is possible will be readily apparent from the description and figures. The actuator 24 need not be made from a non-magnetic material. In some embodiments it may be made from a material that has less than a selected permeability. In other embodiments it may have a relatively high permeability while being separated from the electromagnetic unit housing 70 by a suitable insulative air gap or by some magnetically insulative material.

As shown in FIG. 2b, this rotational operative connection may be achieved by providing one or more lugs 62 on the actuator 24 and one or more lug slots 64 on the armature 22. While the lugs 62 and lug slots 64 permit the actuator 24 and the armature 22 to drive each other rotationally, they permit the armature 22 to slide axially between a first position shown in FIG. 3a, and a second position shown in FIG. 3b. The first and second positions of the armature 22 are described in further detail, further below.

Referring to FIGS. 3a and 3b and 2a, the actuator 24 further includes a drive slot 66 that receives the second end 42 of the wrap spring 20, thereby fixing the second end 42 of the wrap spring to the actuator 24 and the armature 22. Thus it can be said that there is an operative connection between the armature 22 and the second end 42 of the wrap spring 20. It can be seen that the first clutch member 16 is operatively connected to the armature for rotation about the axis A, as a result of the operative connection between the first clutch member 16 and the first end 40 of the wrap spring 20 and the operative connection between the second end 42 of the wrap spring 20 and the actuator 24 and therefore the armature 22.

It will be noted that the actuator 24 has thereon another portion 67 (FIG. 3a) of the wrap spring support surface 60, and which supports another portion of the radially inner surface 61 of the wrap spring 20 (FIG. 3a). Together the first and second portions 59 and 67 may make up some or all of the wrap spring support surface 60. The wrap spring support surface 60 has a selected radius that is larger than a free state radius of the wrap spring 20, so as to generate a selected amount of preload into the wrap spring 20 when the wrap spring is supported thereon. In other words, if the wrap spring 20 were permitted to, it would radially contract to a free state having a radius that is smaller than the radius of the wrap spring support surface 60. As a result, the wrap spring 20 is under some tension (i.e. it is preloaded by some amount) even when it rests on the wrap spring support surface 60. This preload causes the wrap spring 20 to engage the support surface 60 with a certain amount of force.

During use, when the first clutch member 16 rotates and the clutch 14 is disengaged centrifugal forces act on the wrap spring 20 from the speed of rotation itself and urge it to radially expand. Additionally, during use, the engine 12 (FIG. 1) may undergo relatively strong accelerations (i.e. ramp-ups in engine speed) during, for example, aggressive driving maneuvers or during transmission downshifts, or even resulting from torsional vibration from the engine 12. These accelerations may momentarily urge the first end 40 of the wrap spring 20 away from the second end 42 in a selected circumferential direction that urges the wrap spring 20 to radially expand. If the wrap spring 20 had no preload in it, substantially any force urging it to radially expand would result in at least some amount of radial expansion of the wrap spring 20 away from the support surface 60. This can result in noise when the wrap spring 20 re-contacts the support surface 60 after the force causing it to expand is removed or reduced. Also, if the force was sufficiently strong, the wrap spring 20 could expand by a sufficient amount to momentarily engage the inner surface 39 of the second clutch member 18, thereby momentarily operatively connecting the first and second clutch members 16 and 18. Depending on what is driven by the second clutch member, this could result in a variety of different problems. For example, if the accessory that is driven by the second clutch member 18 is a supercharger, this could result in additional air being transported into the combustion chambers of the engine 12 when it is not expected by the Engine Control Unit (ECU—not shown), resulting in turn in an unexpected change in the stoichiometry of the air/fuel mixture in the combustion chambers. This could lead to improper fuel combustion or other problems, and could ultimately result in a fault being generated by the ECU when it senses some unexpected change in engine performance brought on by the inadvertent momentary operation of the supercharger. Aside from noise and the potential for unintended operation of a driven accessory, the wrap spring 20 could incur repeated expansion and contraction if it was subject to vibration and was not preloaded. This could result in wear, fatigue and ultimately a reduced operating life for the wrap spring 20. By providing the aforementioned preload in the wrap spring 20, the preload overcomes these forces at least to some extent so as to provide the wrap spring 20 with a selected amount of resistance to expand away from the wrap spring support surface 60. As a result, problems with noise and with inadvertent operation of the driven accessory may be reduced or eliminated. The benefits of providing the preload in the wrap spring 20 described above may be applicable to any structure wherein the wrap spring 20 rotates with a first clutch member and is selectively controllable to expand into engagement with a second clutch member to operatively connect the first and second clutch members, wherein a wrap spring engagement drive structure that includes the electromagnetic unit and an armature is used. The benefits of providing the preload in the wrap spring 20 may also be applicable when any other suitable kind of wrap spring engagement drive structure is used.

In the embodiment shown in FIGS. 3a and 3b, the wrap spring engagement drive structure includes the armature 22, the actuator 24, the electromagnetic unit 26, and the second clutch member 18 itself.

Instead of providing a wrap spring support surface 60 that has a larger radius than the free state radius of the wrap spring 20, in an alternative embodiment the wrap spring 20 may be permitted to contract all the way to its free state radius and it may have a relatively larger radial spacing in that state from the inner surface 39 of the second clutch member 18. By providing a large radial spacing, even if the wrap spring expands under centrifugal forces or engine accelerations, it will be unlikely to engage the inner surface 39 of the second clutch member 18.

The armature 22 is preferably made from a material that has at least a selected magnetic permeability but that also reaches magnetic saturation under selected conditions, which are described further below. The material of the actuator 22, however, may be selected to have a relatively low magnetic permeability. This inhibits magnetic flux from being transferred through the actuator and into the electromagnetic unit 26.

In some embodiments, the face on the armature 22 that engages the second clutch member 18, which may be referred to as the friction engagement surface 82, may have a relatively high coefficient of friction and may be largely responsible for generating a strong friction force with the second clutch member 18. In some embodiments, the friction engagement surface 82 may have a similar coefficient of friction to the corresponding surface on the second clutch member 18. In some embodiments it may be the corresponding surface on the second clutch member 18 that has the relatively high coefficient of friction.

With reference to FIG. 3a, in some embodiments the friction engagement surface 82 is closer to the corresponding flux transfer surface on the second clutch member 18 (shown at 80) than the nearby flux transfer surface shown at 68 on the electromagnet housing 70 is to the surface 80. This relative proximity of the friction engagement surface 82 to the second clutch member 18 causes the magnetic flux to preferentially pass into the armature 22. It will be noted however, that even if some flux were transferred from the second clutch member 18 directly into the electromagnet housing 70, there would be a sufficient magnetic force on the armature 22 to draw the armature 22 into engagement with the second clutch member 18 and as the armature 22 began to move towards the second clutch member 18, the flux lines would begin to shift to preferentially pass into the armature 22 from the second clutch member 18. It will be noted that this may occur even in embodiments wherein the friction engagement surface 82 on the armature 22 is positioned at the same distance from the mutually facing surface of the second clutch member 18 as the nearby surface on the electromagnetic unit 26, and even in some embodiments wherein the friction engagement surface 82 on the armature 22 is positioned a bit farther from the mutually facing surface of the second clutch member 26 than the nearby surface on the electromagnetic unit 26.

Figure 3C:
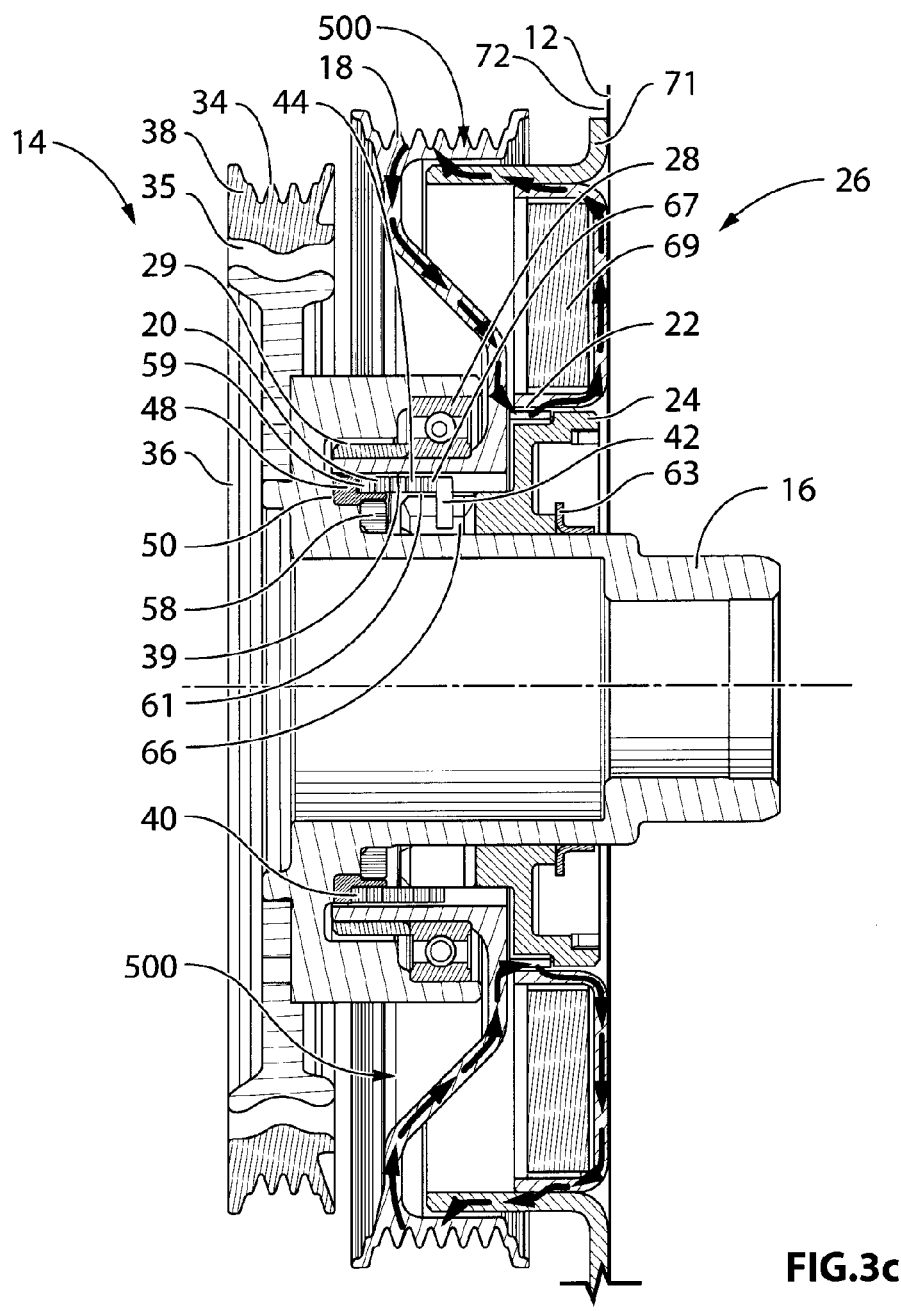
FIG. 3c shows a magnetic circuit formed when the clutch assembly shown in FIG. 1 is in the engaged position.

The electromagnetic unit 26 generates a magnetic flux that flows through the second clutch member 18, the armature 22 and back into the electromagnetic unit 26. The magnetic flux path (i.e. the magnetic circuit) is generally illustrated by arrows 500 shown in FIG. 3c). The electromagnetic unit 26 includes an electromagnet 69. Energization of the electromagnet 69 generates the magnetic flux. The electromagnetic unit 26 further includes an electromagnetic unit housing 70 that holds the electromagnet 69. The electromagnetic unit housing 70 connects to a clutch housing 71 that is configured to mount to a stationary member 72, which may be, for example, the engine block or the engine cover. In a preferred embodiment the engine block or whatever the stationary member is, is made from a non-magnetizable material, such as, for example, a type of aluminum (i.e. pure aluminum or an aluminum alloy).

When the first clutch member 16 is rotating and the second clutch member 18 is stationary the wrap spring 20, the actuator 24 and the armature 22 rotate with the first clutch member 16. When it is desired to engage the clutch assembly 14 (i.e. to bring the clutch to the engaged position so as to operatively connect the first clutch member 16 to the second clutch member 18), the electromagnetic unit 26 is energized, generating a magnetic flux in the second clutch member 18. This magnetic flux draws the armature 22 axially into engagement with the second clutch member 18 with sufficient force to frictionally retard the armature 22 and the second end 42 of the wrap spring 20 relative to the first end 40 of the wrap spring 20. This movement of the second end 42 of the wrap spring 20 causes the wrap spring 20 to radially expand into engagement with the wrap spring engagement surface 39 on the second clutch member 18 thereby operatively connecting the first clutch member 16 with the second clutch member 18.

When the electromagnetic unit 26 is deenergized, there is no longer a magnetic flux in the second clutch member 18, or there may remain a small, residual magnetic flux in the second clutch member 18. As a result, the force of engagement between the armature 22 and the second clutch member 18 is greatly reduced, possibly to zero if there is no longer any residual magnetic flux in the second clutch member 18. As a result, the bias of the wrap spring 20 that urges the wrap spring 20 towards its free state will overcome whatever frictional force there may be between the armature 22 and the second clutch member 18, and will thus cause the wrap spring 20 to contract, and thus to retract from the inner surface 39 of the second clutch member 18, thereby operatively disconnecting the first clutch member 16 from the second clutch member 18. The clutch 14 may thus be referred to as being 'normally disengaged'. This provides a failsafe feature so that the clutch 14 does not drive the pulley 18 (and the accessory or accessories driven by the pulley 18) in situations where the clutch 14 has failed and driving of the pulley 18 is not desired or is dangerous.

In the clutch assembly 14 it is generally desirable for the magnetic force exerted between the second clutch member 18 and the armature 22 to be relatively constant in every production unit and under varying conditions, so that any tolerances in the properties or dimensions of the components in each unit of the assembly 14 and any variability in the operating conditions for a given unit do not significantly affect this force. To that end, as shown in FIG. 3a there is a selected, relatively large amount of axial overlap between the second clutch member 18 and the electromagnetic unit 26 at their mutually facing flux transfer surfaces shown at 76 and 78 respectively. Furthermore, there is a selected, relatively large amount of axial overlap between the electromagnetic unit 26 and the armature 22 at their mutually facing flux transfer surfaces shown at 81 and 83 (FIG. 3a) respectively, both when the armature is in a disengaged position (i.e. it does not engage the second clutch member 18) and when it is in an engaged position). These axial overlaps are selected to be relatively large in order to ensure that there is a relatively large axial overlap between the aforementioned surfaces even when the clutch assembly 14 is manufactured at the extremes of its dimensional tolerances. In this way, the flux transfer between the second clutch member 18 and the relatively thin friction engagement surface 82 of the armature is where the flux transfer is the most restricted. This, in turn, ensures that the configuration of the armature 22 is what controls the magnitude of the magnetic force that holds the armature 22 in engagement with the second clutch member 18 when the electromagnetic unit 26 is energized. By contrast, if there were a restriction at some other point in the magnetic circuit formed by the electromagnetic unit 26, the second clutch member 18 and the armature 22 then the configuration of the armature 22 would have relatively less impact on the force exerted between it and the second clutch member 18, and any dimensional tolerances that exist at the point where the flux transfer is the most restricted would play a role in the aforementioned force. This would introduce a variable into the magnitude of the force that is undesirable.

Another way that the clutch assembly 14 is configured to reduce the range of magnetic force exerted between the armature 22 and the second clutch member 18 is to select the material of the armature 22 and to configure the armature 22 to be relatively thin so that it reaches saturation (or more broadly, so that it reaches at least a selected level of saturation) of magnetic flux quickly under conditions which would generally be unconducive to the generation and transfer of magnetic flux in the aforementioned magnetic circuit. As a result of this, the magnetic force between the second clutch member 18 and the armature 22 would vary within an acceptable range under conditions that would be conducive to generating a relatively greater magnetic flux in the magnetic circuit. For example, the range of operating temperatures for the clutch assembly 14 may be about −40 degrees Celsius to about 120 degrees Celsius. As the temperature increases, the electrical resistance of the electromagnet 69 and the components that feed electric current to it increases, and as a result, the current that reaches electromagnet 69 drops, which in turn reduces the magnetic flux generated by the electromagnet 69. In addition to a change in flux that occurs with temperature, the voltage that will be applied to the electromagnetic unit 26 can vary over some range, such as, for example, about 9V to about 16V, based on fluctuations that typically occur in the vehicle's electrical system. In a preferred embodiment, the armature 22 is configured to be saturated quickly when operating at a temperature proximate the high end of the temperature range (i.e. about 120 degrees Celsius in this example) and when the electromagnetic unit 26 receives a voltage that is proximate the low end of the voltage range (i.e. about 9V in this example). As a result, throughout the operating temperature range and throughout the range of voltages, the magnetic force exerted between the second clutch member 18 and the armature 22 will vary within a selected acceptable range.

Figure 5:
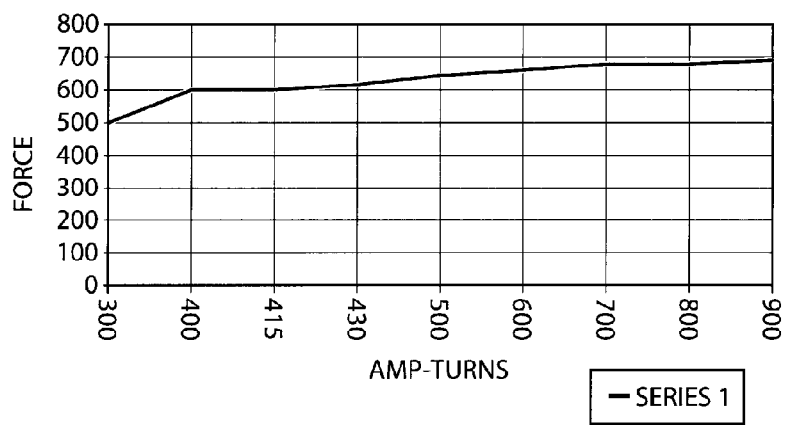
FIG. 5 is a graph showing test results for the force to hold the clutch assembly in accordance with an embodiment of the invention in an engaged position.

FIG. 5 show graphs of results from magnetic finite element analyses showing the force exerted on the armature when there is a 0 gap (i.e. when the armature 22 is engaged with the second clutch member 18), for configurations of clutch assemblies that are similar to the clutch assembly 14. The graphs show the relationship between the force generated (in Newtons) in relation to magnetomotive force (MMF) as measured in Ampere-Turns. As can be seen in the graph in FIG. 5, the generated force changes by about 36% (from about 505N to about 688N) over a range of MMF that varies from 300 AT to 900 AT. This is a much smaller variation than would occur if the armature 22 were not configured to be substantially saturated under the worst case scenario for flux generation.

Thus, by selecting suitable materials for the armature and by configuring the armature in a selected way, (e.g. to be relatively thin, particularly radially), the force generated on the armature when the armature is engaged with the second clutch member 18 can remain within an acceptable range even under relatively wide ranges of operating conditions. In an exemplary embodiment, the radial thickness of the armature 22 is about 1.25 mm. In some embodiments, the armature 22 may be provided with a magnetic flux choke point that would reduce the magnetic flux through the armature 22 and would thus promote reaching saturation of the armature 22 under conditions of poorer magnetic flux generation than would the armature 22 shown in FIGS. 3a and 3b. The magnetic flux choke point may be in the form of a reduction in the cross-sectional area of the armature 22, as can be seen in the sectional views shown in FIG. 10a-10c. For example, instead of having a rectangular cross-sectional shape as seen in FIGS. 3a and 3b, the armature 22 may alternatively have a groove 99 in its radially outer surface shown at 101a (FIG. 10a) that serves to reduce the cross-sectional area (i.e. the cross-sectional area of the armature 22 in a plane parallel to the plane P which appears edge-on in the view shown in FIG. 10a-10c) and to act as a choke point for the magnetic flux. The groove 99 could alternatively be in the radially inner surface shown at 101b (FIG. 10b). Alternatively a groove 99a could be provided in the radially outer surface 101a and another groove 99b could be provided in the radially inner surface 101b (FIG. 10c). By providing the reduction in cross-sectional area axially spaced from the friction engagement surface 82 a magnetic flux choke point can be provided while still providing a selected surface area to the friction engagement surface 82. It may be desirable for the friction engagement surface 82 to have a higher surface area so as to reduce the wear on that surface (by virtue of spreading the force of engagement between the armature 22 and the second clutch member 18 over a selected, large surface area), while providing the choke point so as to promote saturation under conditions of poor magnetic flux generation. In the embodiments shown in FIG. 10a-10c, the reduction in the cross-sectional area of the armature 22 is achieved by a reduction in the cross-sectional thickness of the armature 22. Alternatively, the reduction in the cross-sectional area can be achieved by some other means, such as, for example, by stamping or otherwise providing a circumferential row of apertures through the thickness of the armature 22 (i.e. a row of apertures about the circumference of the armature 22).

As a separate issue from reducing the fluctuation in the magnetic force exerted on the armature 22 by the second clutch member 18, it is advantageous to limit the maximum magnetic force that is applied between the armature 22 and the second clutch member 18, thereby limiting the frictional force exerted between the armature 22 and the second clutch member 18. By limiting this frictional force, a limit is set on the torque that can be transferred through the wrap spring 20 on the second clutch member 18. More specifically, the torque that is transmittable through the coils 44 of the wrap spring 20 to the second clutch member 18 is related to the torque that is applied between the armature 22 and the second clutch member 18 (which may be referred to as the energizing torque). This energizing torque itself depends on the magnetic force between the armature 22 and the second clutch member 18, the coefficient of friction therebetween, and the moment arm of the magnetic force about the axis A. In general the torque that is transmittable at the coils 44 of the wrap spring 20 can have an exponential relationship to the energizing torque. In other words, as the energizing torque increases, the torque transmittable at the coils 44 increases exponentially. Due to the dimensional and material property tolerances in the components that make up the clutch assembly 14, the variability of the voltage applied to the electromagnetic unit 26, the tolerances in the coefficients of friction between the armature 22 and the second clutch member 18 and between the coils 44 and the second clutch member 18, and other factors, there is the potential for the energizing torque to vary dramatically from clutch assembly to clutch assembly and from situation to situation. If the energizing torque were permitted to vary unchecked, it could vary by as much as 300% or more depending on the range of operating conditions the clutch assembly 14 will have to work in, and depending on the tolerances in the various components and properties. As a result, if the energizing torque were simply able to vary unchecked, the wrap spring 20 could be caused to transmit torques that vary significantly based on the exponential relationship mentioned above. Thus, in such a case, either the wrap spring 20 would have to be designed to handle a very large range of torques, or the torque that could be transmitted at the coils 44 could become so high that the wrap spring 20 would be at risk of damage or even failure. However, by configuring the armature 22 so that it has at least a selected amount of saturation (e.g. substantially complete saturation) under the worst case conditions for magnetic flux generation, the magnetic force that is generated under the best case conditions for magnetic flux generation will not vary that dramatically from the flux generated at the worst case conditions. This is a way of setting a limit on the maximum energizing torque available, which therefore sets a limit on the maximum torque that will be transferred at the coils thereby protecting the wrap spring 20 from failure from transmitting too high a torque, and saving the wrap spring 20 from having to be overdesigned just to protect it under scenarios where the tolerances and conditions would have created a very high energizing torque.

By configuring the armature 22 to have a selected amount of saturation as noted above under the worst case conditions for flux generation, when the first clutch member is rotating and the second clutch member 18 is stationary, and the electromagnetic unit 26 is energized so as to engage the clutch 14, if the torque required to drive the second clutch member 18 is too high (i.e. beyond a selected limit), the armature 22 will slip on the second clutch member 18. As a result, the angular movement of the second end 42 of the wrap spring 20 will be limited to a selected maximum angle due to the slippage. The selected maximum angle acts as a limit for the amount of expansion that is possible for the wrap spring 20 and therefore acts to limit the force that can be exerted by the wrap spring 20 on the inner surface 39 of the pulley 18. By limiting this force, the amount of torque that can be transferred through the wrap spring 20 to the pulley 18 is limited to a selected maximum torque.

Another way of reducing the likelihood of an unintentional expansion of the wrap spring 20 is to control the amount of inertia that exists in certain components of the clutch assembly 14. One component in particular whose rotational inertia is selected to be low is the assembly of the actuator 24 and the armature 22 (which may be referred to as the actuator/armature assembly. As noted earlier in this document, the actuator 24 has been described as being made from a plastic material, such as Nylon 4-6 modified with Teflon™. Also as noted earlier the armature 22 may be made from a 1010 steel. Thus, in such an embodiment, a large portion of the actuator/armature assembly is made from a plastic material (i.e. a first material having a relatively lower density), and only a relatively thin band at the radially outer end of the actuator/armature assembly is made from metallic material (i.e. a second material having a relatively higher density than the first material). In at least some embodiments, the aspect ratio of the armature 22 is such that the radial thickness (shown at T in FIG. 3b) of the armature 22 is smaller than its axial length (shown at L in FIG. 3b). The mean radius of the armature 22 is selected so that it provides a selected combination of a selected force between it and the second clutch member 18 and a relatively low rotational inertia. The actuator 24 provides the rotational support of the armature 22 on the first clutch member 16 while having relatively low weight that is the result of its configuration and of its material of construction.

By controlling the inertia of this assembly, the actuator/armature assembly will have a reduced resistance to sudden changes in speed resulting from accelerations of the engine, for example. By contrast, if the inertia of the actuator/armature assembly were relatively high, and the first clutch member 16 underwent a high acceleration, the inertia of the actuator/armature assembly might cause such a lag in its rotation, that the wrap spring 20 could expand radially off the support surface 60 (potentially creating noise when it returns) and/or generating repetitive stresses in the wrap spring potentially reducing its life and/or potentially engaging the second clutch member 18 inadvertently creating other problems as described earlier.

Because there is so little resistance to movement of the armature 22 and because of the exponential relationship between the energizing torque and the torque at the wrap spring coils 44, the energization of the electromagnetic unit 26 may require somewhere in the range of about 5 W to about 30 W, with a predicted typical operating range of between about 10 W to about 15 W, of power in order to generate the magnetic flux needed to drive the armature 22 into the second clutch member 18 with sufficient force to engage the coils 44 with the second clutch member 18.

Also with respect to inertia, it will be noted that the second clutch member 18 is made from a relatively thin walled material (albeit a metallic material at least in some embodiments) so as to reduce its inertia. Any lightening holes provided in it would have to be configured to ensure that it can sufficiently transport a magnetic flux to the armature 22.

With reference to FIG. 3a, the operation of the clutch assembly 14 and the torque flow path are described as follows. With the clutch 14 disengaged, the first clutch member 16 rotates while the second clutch member 18 (i.e. the pulley 18) remains stationary. One of the lugs 52 (FIG. 4c) on the first clutch member 16 drive the first end 40 of the wrap spring 20 and as a result, the wrap spring 20 rotates with the first clutch member 16. The actuator 24, which sits on the first clutch member 16 is driven to rotate with the first clutch member 16 by frictional engagement between the radially inner surface of the actuator 24 and the radially outer surface of the first clutch member 16.

Energization of the electromagnet 69 draws the armature 22 into engagement with the pulley 18. Because the pulley 69 is stationary, the engagement between the armature 22 and the pulley 18 causes the armature 22, and therefore the actuator 24 to slow down relative to the first clutch member 16. Because the second end 42 of the wrap spring 20 is engaged with the drive slot 66 in the actuator 24, the slowdown of the actuator 24 causes the second end 42 of the wrap spring 20 to move angularly relative to the first end 40, which in turn causes the wrap spring 20 to expand radially until the radially outer surface of the coils 44 engages the radially inner surface 39 of the pulley 18. Torque is then transferred from the wrap spring coils 44 to the inner surface 39, thereby driving the pulley 18.

The embodiment shown in FIGS. 1-4c shows the first clutch member 16 as being directly mounted to the crankshaft 10 of the engine 12. It will be noted that in some applications, (e.g. where there is no enough room) the crankshaft 10 could have a first pulley directly thereon which drives a second pulley on another shaft (i.e. a jackshaft) via a belt. The clutch assembly 14 could be mounted to that jackshaft, such that the jackshaft would drive the first clutch member, and the first clutch member would be selectively operatively connectable to the second clutch member. Another belt or the like could run from the second clutch member to a pulley on an accessory to be driven.

As noted above, an advantage to the embodiment shown in FIGS. 1-4c is that there are relatively fewer components needed for it to operate than are used in certain clutches of the prior art. Being constructed of fewer components reduces the cost of the clutch assembly 14, reduces tolerance stack-ups, and can increase reliability since there are fewer components that can fail, as compared with clutch assemblies of the prior art.

The operation of the clutch assembly 14 may be controlled by a controller shown at 88 in FIG. 1. Because so little power is needed to engage the clutch assembly 14, the controller 88 may be directly connected the electromagnet 69 (FIG. 3a) via electrical conduits shown at 90 and a MOSFET or the like in the controller 88 may directly control the current through the conduits 90. This arrangement is much less expensive than it is for some clutches of the prior art, such as some friction plate clutches. Those clutches require a significant amount of power to engage, and less power but still a significant amount of power to hold the engaged position. Those clutches would not be controllable directly from a controller and would thus require the controller to be connected to a relay, which would be connected to a source of higher electrical current than can typically be handled by a controller. The relay would then be controlled by the controller 88 in order to control the current to the clutch. Conduits would extend from the source of electrical current (which is ultimately the battery) to the relay and from the relay to whatever clutch actuation mechanism requires it. Thus, because of the low power needed to operate the clutch 14, thereby permitting it to be controlled directly from the controller 88, there is no need for the aforementioned relay, nor for the conduits that can carry high current.

Figure 6A:
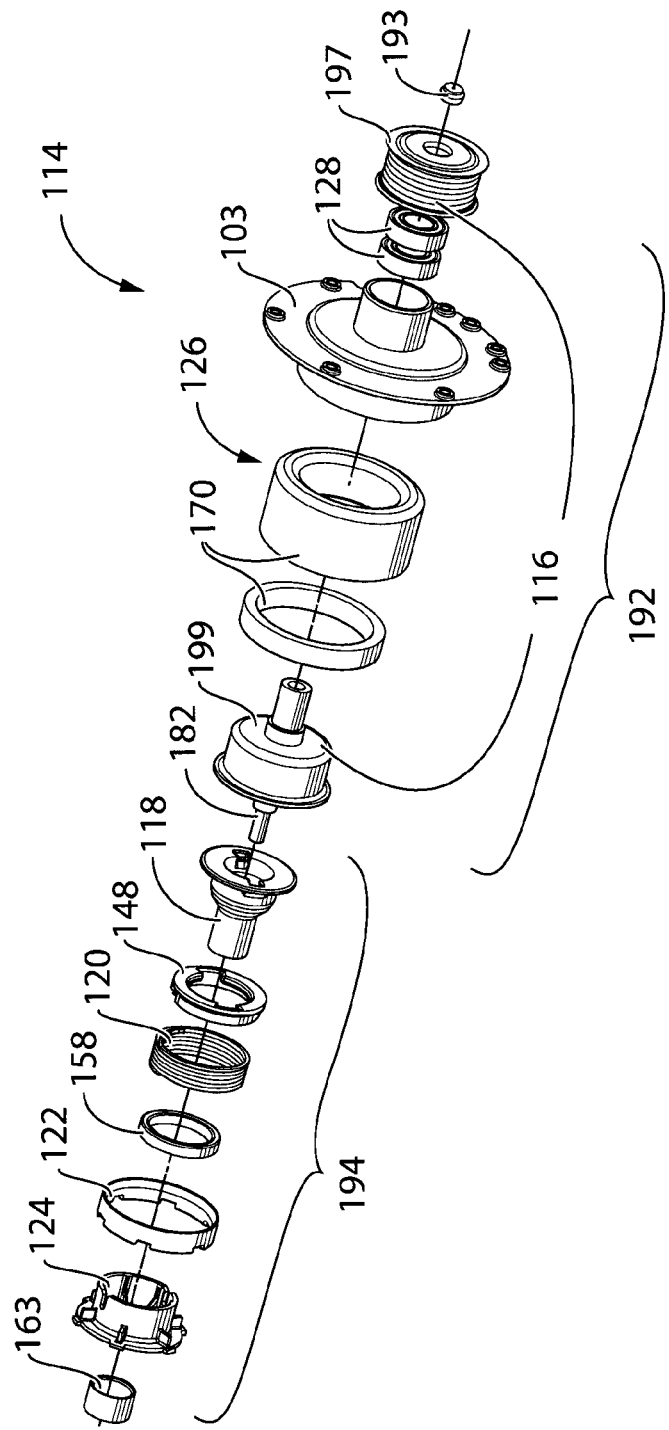
FIGS. 6a and 6b are perspective exploded views of a clutch assembly in accordance with another embodiment of the invention.
Figure 6B:
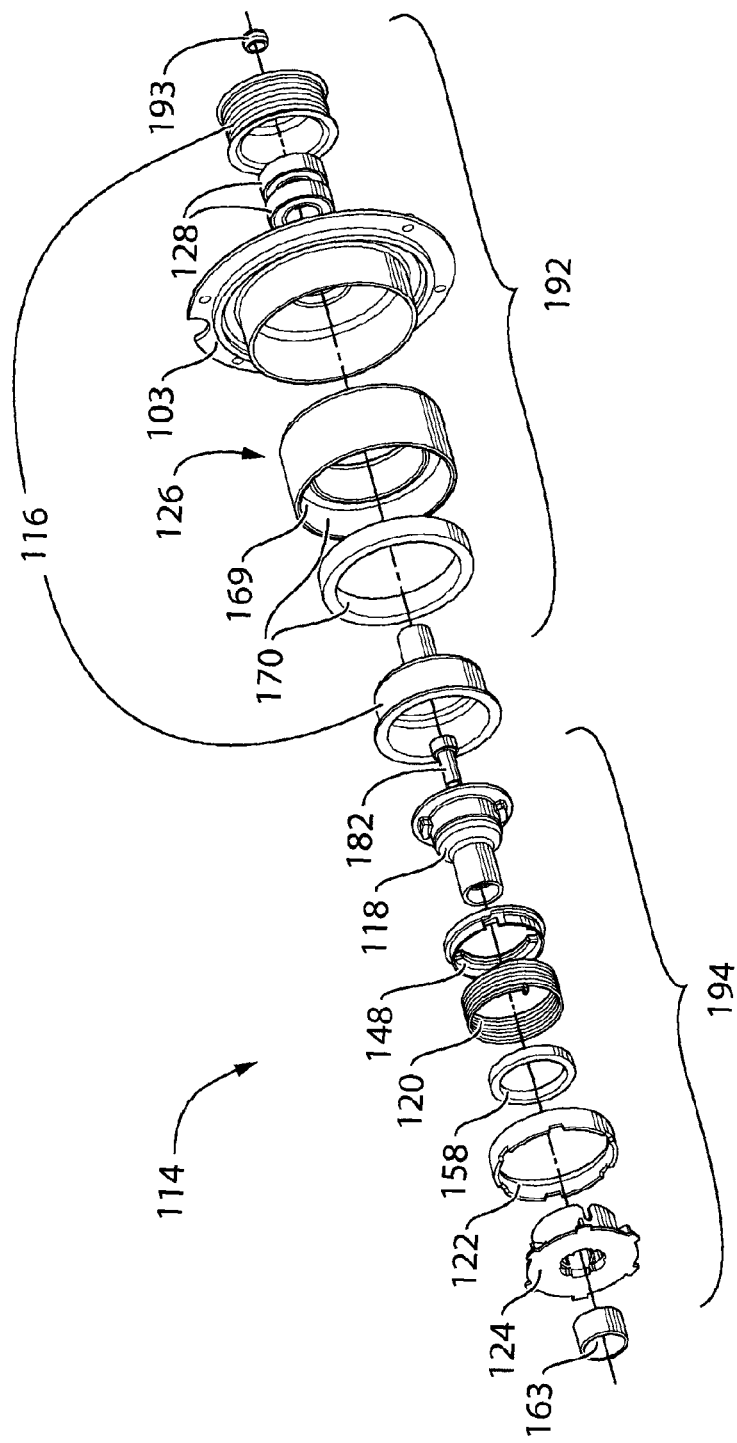

The embodiment shown in FIGS. 1-4c selectively drives a pulley (i.e. second clutch member 18) from a rotating shaft (i.e. crankshaft 10). Reference is made to FIGS. 6a and 6b, which shows a clutch assembly 114 that is used to selectively transmit power from a drive member such as a belt, a timing belt, a chain, a gear or any other suitable drive member, (not shown) through to a shaft 110 of an accessory 112.

Referring to FIGS. 6a and 6b, the clutch assembly 114 includes a first clutch member 116 and a second clutch member 118 that are both rotatable about the axis A, a wrap spring 120, an armature 122, an actuator 124 and an electromagnetic unit 126. The clutch assembly 114 may be similar to the clutch assembly 14 shown in FIG. 1, and has similar advantages.

Figure 7A:
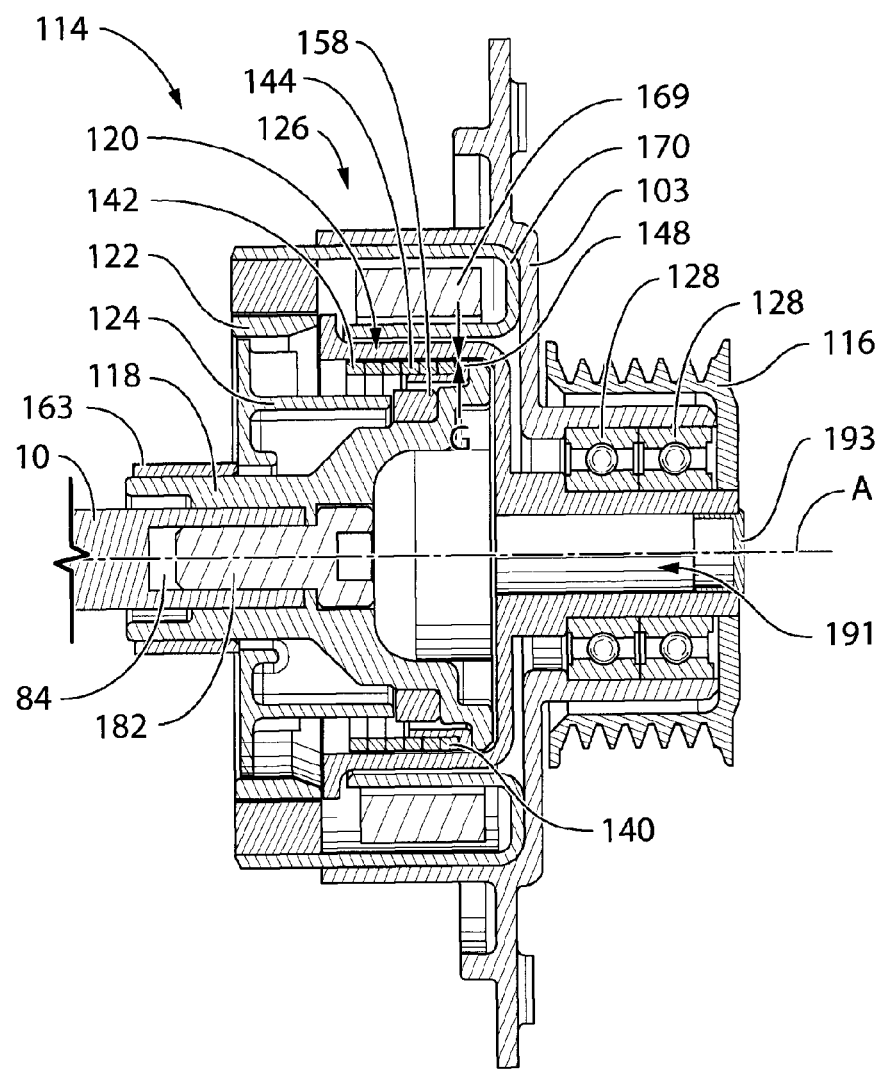
FIGS. 7a and 7b are sectional side views of the clutch assembly shown in FIGS. 6a and 6b, in disengaged and engaged positions respectively.
Figure 7B:
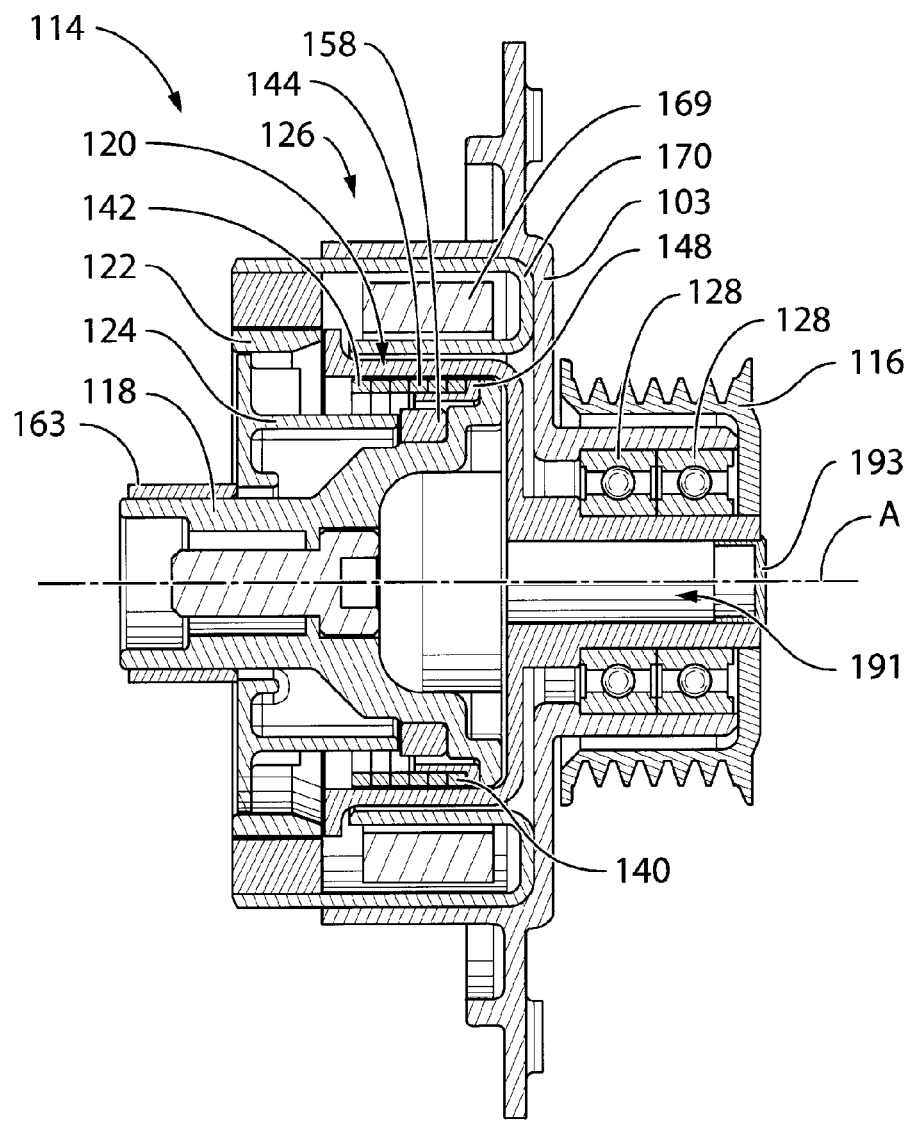

The clutch assembly 114 is movable from a disengaged position shown in FIG. 7a to an engaged position shown in FIG. 7b by transmission of a magnetic flux from the electromagnetic unit 126 through the first clutch member 116, the armature 122 and back into the electromagnetic unit 126. The clutch assembly 114 may be referred to as being engaged when it is in the engaged position and may be referred to as being disengaged or unengaged when it is in the disengaged position.

The first clutch member 116 is driven by a drive member such as a belt, a timing belt, a chain, a gear or any other suitable drive member. This drive member may itself be driven by any suitable means, such as, for example, by a crankshaft of an engine in a vehicle. In the embodiment shown in FIGS. 6a and 6b, the first clutch member 116 is a pulley, however it could be some other member, such as a sprocket, a gear or any other suitable member. The first clutch member 116 may be made from any suitable material, such as a suitable steel. The first clutch member 116 may be rotatably supported on a stationary member 103, which may be referred to as an electromagnetic unit support member, via one or more bearing members 128. In this embodiment, there are two bearing members 128 which are ball bearings however any other suitable type of bearing member could be used.

Figure 8:
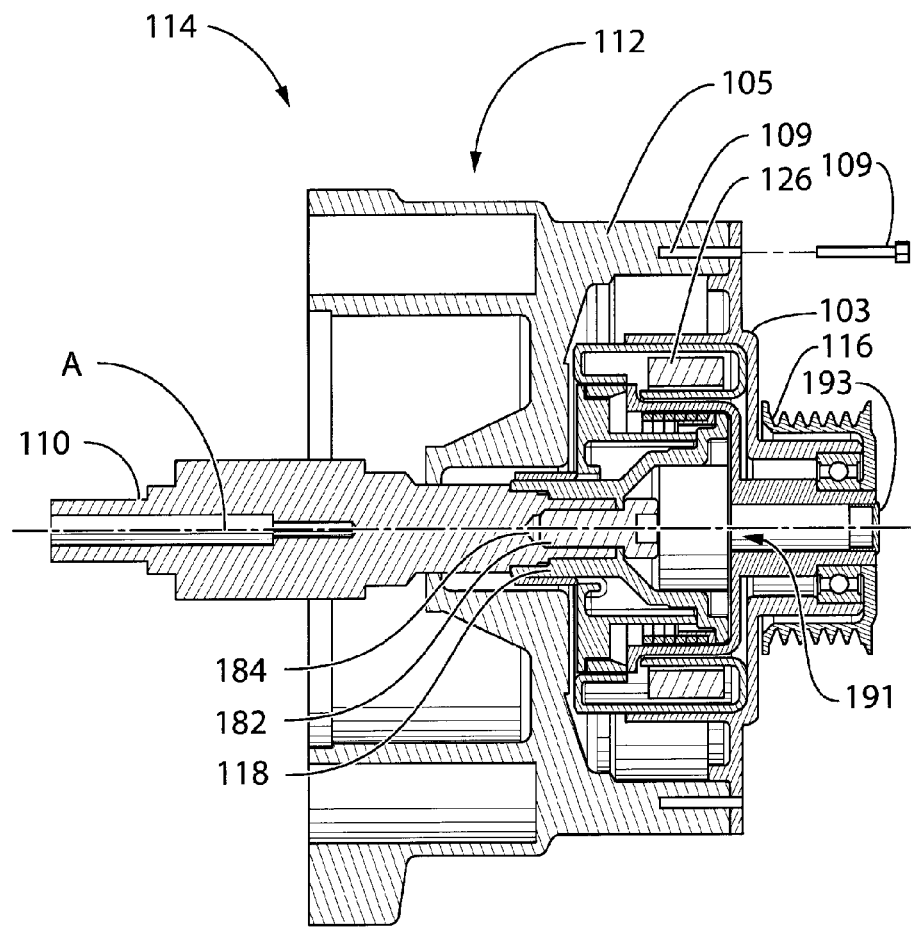
FIG. 8 is a sectional side view of a portion of an alternative clutch assembly that is similar to the embodiment shown in FIGS. 6a and 6b, that includes an optional structure that facilitates installation of the clutch assembly to a driven accessory.

Reference is made to FIG. 8, which shows a minor variant of the embodiment shown in FIGS. 6a and 6b, which uses the same reference numerals. The electromagnetic unit support member 103 itself mounts to the accessory housing shown at 105 so as to locate the electromagnetic unit 126 and the first clutch member 116 about the axis A. The mounting may be by way of threaded fasteners shown at 107 which pass through the electromagnetic unit support member 103 and thread into accessory housing apertures 109. The electromagnetic unit support member 103 may also be referred to as a clutch housing, since it serves to house at least some of the components of the clutch assembly 114.

The second clutch member 118 is driven by the first clutch member 116 when the clutch 114 is engaged (FIG. 7b), and may be idle when the clutch 114 is disengaged (FIG. 7a). The second clutch member 118 is connected to the input shaft 110 of the driven accessory 112. In the embodiment shown, the second clutch member 118 is in the form of a shaft extension.

The second clutch member 118 mounts to the input shaft 110 as follows: The second clutch member 118 has a shaft mounting portion 180 that has a cross sectional shape that mates with the accessory input shaft 110 and fixes the second clutch portion 118 rotationally with the accessory input shaft 110. In the embodiment shown the shaft mounting portion 180 has a splined shape in cross-section (i.e. it is splined) and it interlocks with corresponding splines on the input shaft 110. The second clutch member 118 further includes an input shaft aperture 181, which receives a threaded fastener 182 that passes through it and threads into an input shaft aperture 184 in the end of the input shaft 110, thereby fixing the second clutch member 118 axially on the input shaft 110.

To install the threaded fastener 182 into the input shaft 110, an installer passes a fastener tool 190 (e.g. a hex driver) through an aperture 191 in the first clutch member 116 to engage and drive the threaded fastener 182 into place in the aperture 184 in the end of the input shaft 110. After installation of the first and second clutch portions, a cap 193 can be inserted into the aperture in the first clutch member 116 into which the position fixing tool 186 and the fastener tool 190 passed.

Figure 8A:
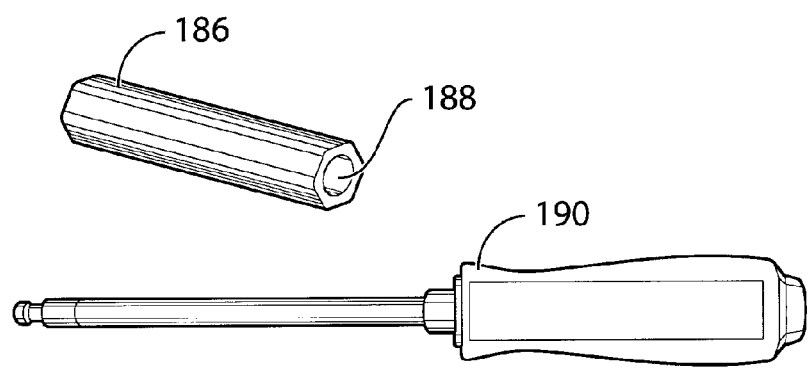
FIG. 8a are views of tools that are used for the installation of the clutch assembly shown in FIGS. 6a and 6b to an accessory.

In an alternative embodiment shown in FIG. 8, the second clutch member 118 further includes an anti-rotation element that is configured to engage a position fixing tool 186 (FIG. 8a) through the first clutch member 116. When engaged with the position fixing tool 186, the position fixing tool 186 can be held stationary so as to fix the second clutch member 118 and therefore the input shaft 110 rotationally. The position fixing tool 186 has a pass-through aperture 188 that permits an installer to pass a fastener tool 190 (e.g. a hex driver) therethrough to engage and drive the threaded fastener 182 (FIG. 8) into place in the aperture 184 in the end of the input shaft 110, while the installer holds the position fixing tool 186 stationary to prevent rotation of the input shaft 110 while the threaded fastener 182 is being threaded into the aperture 184.

Referring again to FIGS. 7a and 7b, the actuator 124, the armature 122, the wrap spring 120 and the carrier 148 are all engaged with each other in similar manner to the actuator 24, the armature 22, the wrap spring 20 and the carrier 48 (FIGS. 3a and 3b), in the sense that the armature 122 is rotationally operatively connected with a second end 142 of the wrap spring 120 (i.e. via the actuator 124 in the embodiment shown), the actuator 124 is rotationally operatively connected with the armature 122, the carrier 148 is rotationally operatively connected to a first end 140 of the wrap spring 120 and the carrier 148 is rotationally operatively connected with the second clutch member 118.

One difference however, is that the actuator 124, the armature 122, the wrap spring 120 and the carrier 148 are mounted to the second clutch member 118 and are thus stationary when the clutch 114 is disengaged, whereas the actuator 24, the armature 22, the wrap spring 20 and the carrier 48 are mounted to the first clutch member 116 and thus rotate with it even when the clutch 14 is disengaged.

The actuator 124 is kept in position axially at one end by an actuator retainer 163 which is fixed to the second clutch member 118 (e.g. by press-fit) and at another end by a carrier retainer 158 which is fixed to the second clutch member 118 (e.g. by press-fit), and which also engages the carrier 148 to hold it in place axially.

The carrier 148 may be engaged with the second clutch member 118 in the same way as the carrier 48 and first clutch member 16 in the embodiment shown in FIGS. 1-4c, (i.e. by way of lugs and lug slots). The actuator 124 and armature 122 may engage each other in the same way as the actuator 24 and the armature 22 in FIGS. 2a and 2b. The first and second ends of the wrap spring 120 may be engaged by the carrier 148 and the actuator 124 in the same way as the wrap spring 20 with the carrier 48 and the actuator 24 in the embodiment shown in FIGS. 1-4c.

The electromagnetic unit 126 is similar to the electromagnetic unit 26 (FIG. 3a) and includes an electromagnet 169 and an electromagnetic unit housing 170. The electromagnetic unit housing connects to the electromagnetic unit support member 103 (i.e. the clutch housing 103) by any suitable means, such as by fasteners, press-fit, staking or the like.

In this embodiment, when the first clutch member 116 rotates and the second clutch member 118 is stationary, the magnetic flux in the first clutch member 116 draws the armature 122 axially into engagement therewith with sufficient force to drive the armature 122 and the second end 142 of the wrap spring 120 rotationally about the axis A relative to the first end 140 of the wrap spring 120 so as to radially expand the wrap spring 120 into engagement with the first clutch member 116 thereby operatively connecting the first clutch member 116 to the second clutch member 118.

The clutch housing 103, the first clutch member 116 and the bearing member 128 form at least part of a first clutch portion shown at 192. In this example, the electromagnetic unit 126 also forms part of the first clutch portion 192. The second clutch member 118, the armature 122 and the wrap spring 120 form at least part of a second clutch portion 194. In this example, the actuator 124 and the carrier 148 also form part of the second clutch portion 194. It will be noted that there is a radial gap G between the first clutch portion 116 and the second clutch portion 118. In other words, in use, when the wrap spring 120 is disengaged with the first clutch member 116 there is a radial gap between the first clutch portion 192 and the second clutch portion 194.

As a result of this, there is some amount of radial play that is available between the first and second clutch portions 192 and 194. This radial play provides the clutch assembly 114 with the capability to accommodate tolerances in the positions of the accessory housing apertures 109 in the accessory housing 105 relative to the input shaft aperture 184. In a situation where the accessory housing apertures 109 and/or the input shaft aperture 181 are out of position relative to each other, when the clutch assembly 114 is mounted to the accessory 112, the radial gap G would not have a uniform size throughout its circumference. However, in such a case, when the electromagnetic unit 126 is energized, the wrap clutch 120 is flexible and could simply expand and take on a slight eccentricity relative to the axis A as it engages the inner surface 139 of the crankshaft adapter 116. As a result, the clutch assembly 114 can operate with essentially no change in its performance in situations where there is some lack of concentricity between the first and second clutch portions 192 and 194. In some accessories, it is expected that there could be a tolerance in the positions of the housing apertures 105 and the input shaft aperture 181 that is about 0.25 mm. This tolerance is easily accommodated by the clutch assembly 114.

By virtue of this capability to accommodate misalignment or lack of concentricity, the clutch assembly 114 can be mounted as a complete assembly to the accessory housing 105 and input shaft 110 all at once. By contrast, some clutch assemblies of the prior art, and in particular, some clutch assemblies that employ armatures that are moved across a gap to engage or disengage the clutch assembly are mounted component by component or subassembly by subassembly and each component or subassembly is shimmed as necessary to ensure that strict tolerances in certain gaps are kept. This capability of being mounted as a complete assembly without the need for shimming makes the clutch assembly 114 relatively quick and easy to install as compared to some clutch assemblies of the prior art. Furthermore, in some embodiments, it may be preferable to grease certain internal components of the clutch assembly 114 such as the wrap spring 120. As a result, it is advantageous to be able to ship the clutch assembly from the clutch assembly manufacturer's facility with the grease already applied. This is possible in the embodiment shown in FIGS. 6a and 6b because the clutch assembly 114 can remain in one piece during the installation process. In some embodiments, the clutch assembly 114 will have no lubrication at all. In other embodiments the clutch assembly 114 may have a petroleum-based lubricant or a more-advanced polymer-based, polymer/ceramic or nanoparticle augmented lubricant instead of a grease-type lubricant. In yet other embodiments, a lubricious coating may be applied to the inner surface of the first clutch member 116 and/or to the wrap spring 120 itself.

The embodiment shown in FIGS. 6a and 6b may be controlled by a controller similar to the controller 88 to similar advantage.

Figure 10A:
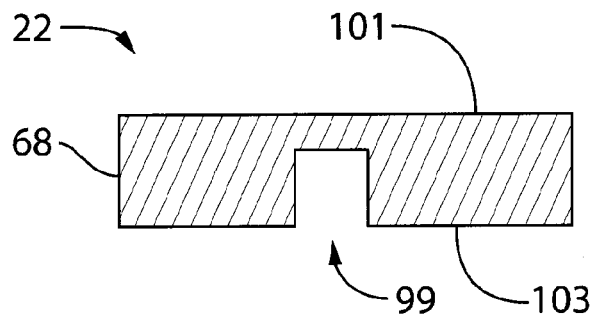
FIGS. 10a, 10b and 10c are sectional side views of alternative shapes for an armature that can be used in the clutch assemblies shown in FIGS. 1 and 6a and 6b.
Figure 10B:
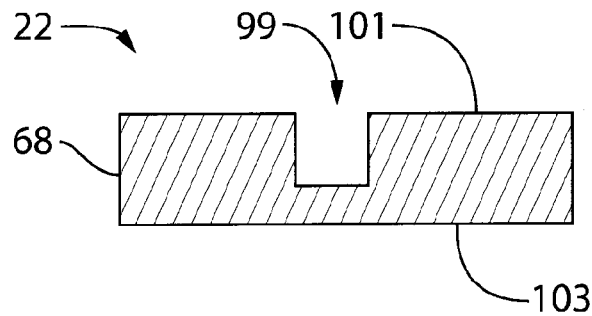
Figure 10C:
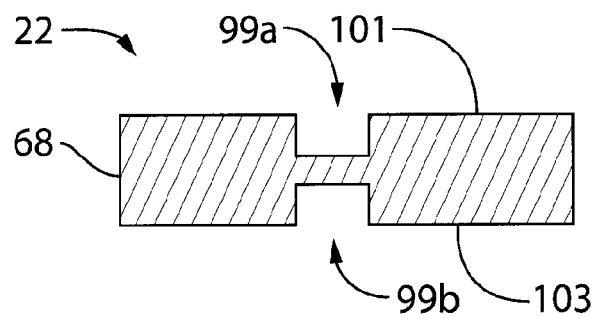

The armature 122 may have a cross-sectional shape as shown in FIGS. 7a and 7b, or it could have some other cross-sectional shape, such as any of the shapes shown for the armature 22 in FIG. 10a-10c.

Inclusion of Decoupler

Figure 9:
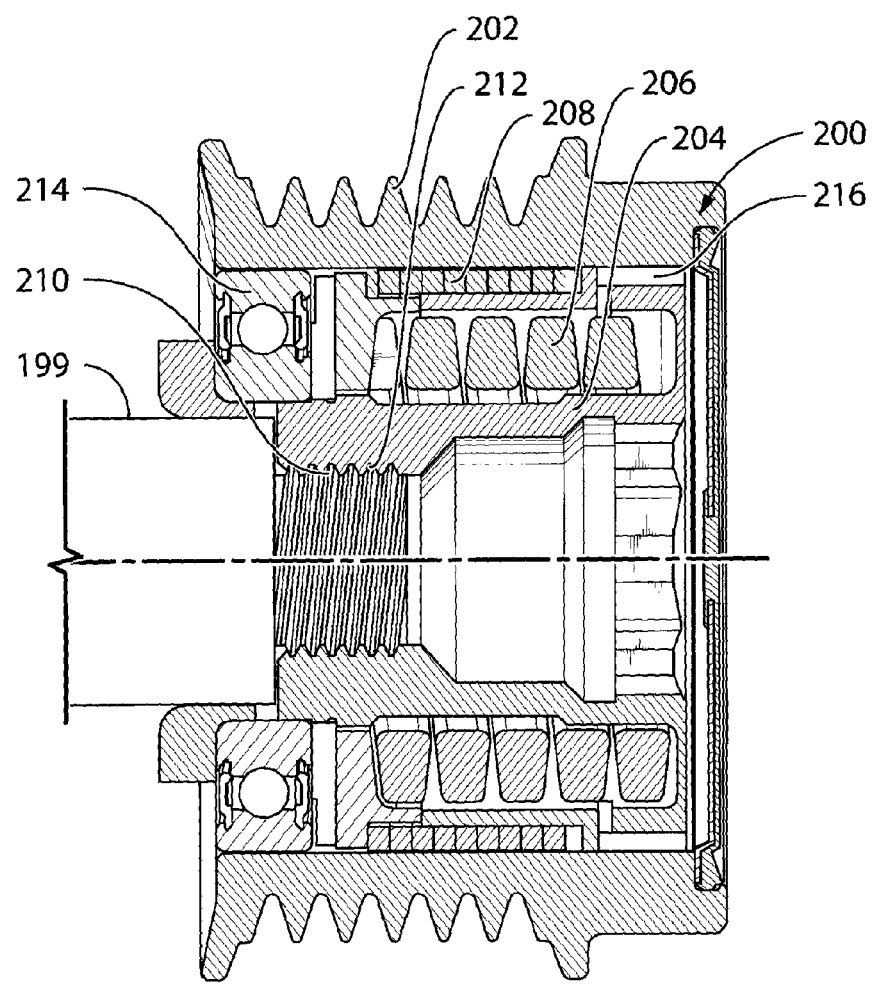
FIG. 9 is a sectional side view of a portion of an alternative clutch assembly that is similar to the embodiment shown in FIGS. 6a and 6b, but that includes an optional decoupler.

The clutch assemblies 14 and 114 may optionally include an isolator, an overrunning clutch, or a combination of both, which is referred to as a decoupler. FIG. 9 shows a decoupler 200 that is integrated into the clutch assembly 114. The decoupler 200 transfers torque from a pulley 202 to a hub 204. The pulley 202 is part of the first clutch member 116 and would replace the pulley 197 (FIG. 6a). The pulley 202 could instead be a gear, a sprocket or any other suitable driven member. The hub 204 in this instance is also part of the first clutch member 116, and connects to the hub portion 199 of the first clutch member 116 (FIG. 9 and FIG. 6a). In this embodiment, the hub portion 199 (FIG. 6a) of the first clutch portion 116 may be modified to have a threaded end 212 (FIG. 9) that is received in a threaded portion 210 of the hub 204 thereby joining them together. The bearing members shown at 214 (which is a ball bearing) and 216 (which is a bushing) may be provided to center the pulley 202 relative to the hub 204. Thus, the bearing members 128 shown in FIGS. 7a and 7b may still be included in this embodiment to center the hub 199 relative to the member 103. Alternatively some other way of supporting the various components may be provided so as to reduce the number of bearing members included.

The decoupler 200 includes a resilient isolation member 206, which in this exemplary embodiment is a torsion spring, and a one-way clutch member 208, which in this exemplary embodiment is a wrap spring. The pulley 202, which is driven by a belt or the like (not shown), drives the hub 204 through the one-way clutch member 208 and the isolation member 206. The isolation member 206 may be in the form of a torsion spring that provides some amount of isolation to the hub 204 from torsional vibrations incurred by the pulley 202. The wrap spring 208 permits the hub 204 to temporarily overrun the pulley 202 when the pulley 202 is stopped. Instead of providing the decoupler 200, any other suitable decoupler, isolator, or one-way clutch member may be used, such as, for example, any of the structures shown in patent documents U.S. Pat. No. 6,083,130, U.S. Pat. No. 7,153,227, U.S. Pat. No. 7,618,337, U.S. Pat. No. 7,712,592, U.S. Pat. No. 7,207,910, U.S. Pat. No. 5,722,909 and WO2011072391A1, all of which are incorporated herein by reference in their entirety. Alternatively, if it were deemed acceptable for a particular application, any suitable structures could be used from the following patents and patent applications: EP01764524A1, U.S. Pat. No. 7,985,150B2, U.S. Pat. No. 7,708,661B2, U.S. Pat. No. 7,708,661 and US20060240926, all of which are incorporated herein by reference in their entirety.

In the example shown, the decoupler 200 transfers torque between an upstream member, namely the pulley 202, and a downstream member, namely the hub 204. It is alternatively possible to provide an isolation member 206 only between an upstream member (e.g. the pulley 202) and a downstream member (e.g. the hub 204) and to omit the one-way clutch member 208 and associated components. It is alternatively possible to provide the one-way clutch member 208 only between an upstream member (e.g. the pulley 202) and a downstream member (e.g. the hub 204) and to omit the isolation member 206 and associated components.

While the decoupler 200 is shown as being included in the first clutch member 116, it will be understood that the decoupler 200 (or alternatively a one-way clutch without an isolator, or alternatively an isolator without a one-way clutch) could be included in the second clutch member 118.

While the decoupler 200 is shown as being part of the clutch assembly 114 it is possible for the decoupler 200 (or an isolation member only, or a one-way clutch member only) to be incorporated into the clutch assembly 14.

The isolation member 206 is shown as a torsion spring, however it will be noted that in some other embodiments the isolation member could be a resilient polymeric layer (e.g. made of rubber or the like) that is sandwiched between first and second portions of the pulley 202.

It will be further noted that the one-way clutch needn't be a wrap spring clutch, it could alternatively be a sprag clutch a roller clutch or any other suitable type of one-way clutch.

Figure 11A:
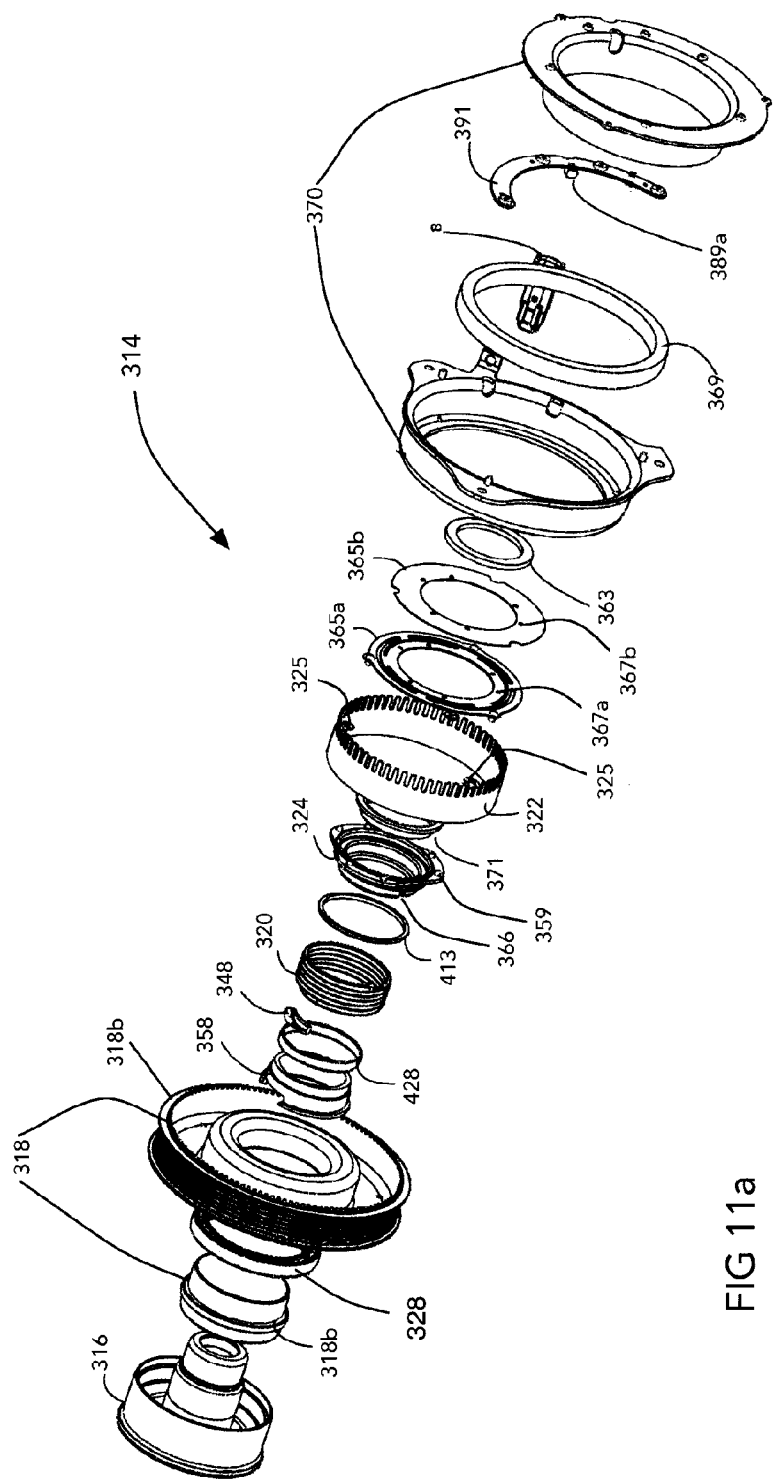
FIGS. 11a and 11b are exploded perspective views of another embodiment of a clutch assembly.
Figure 11B:
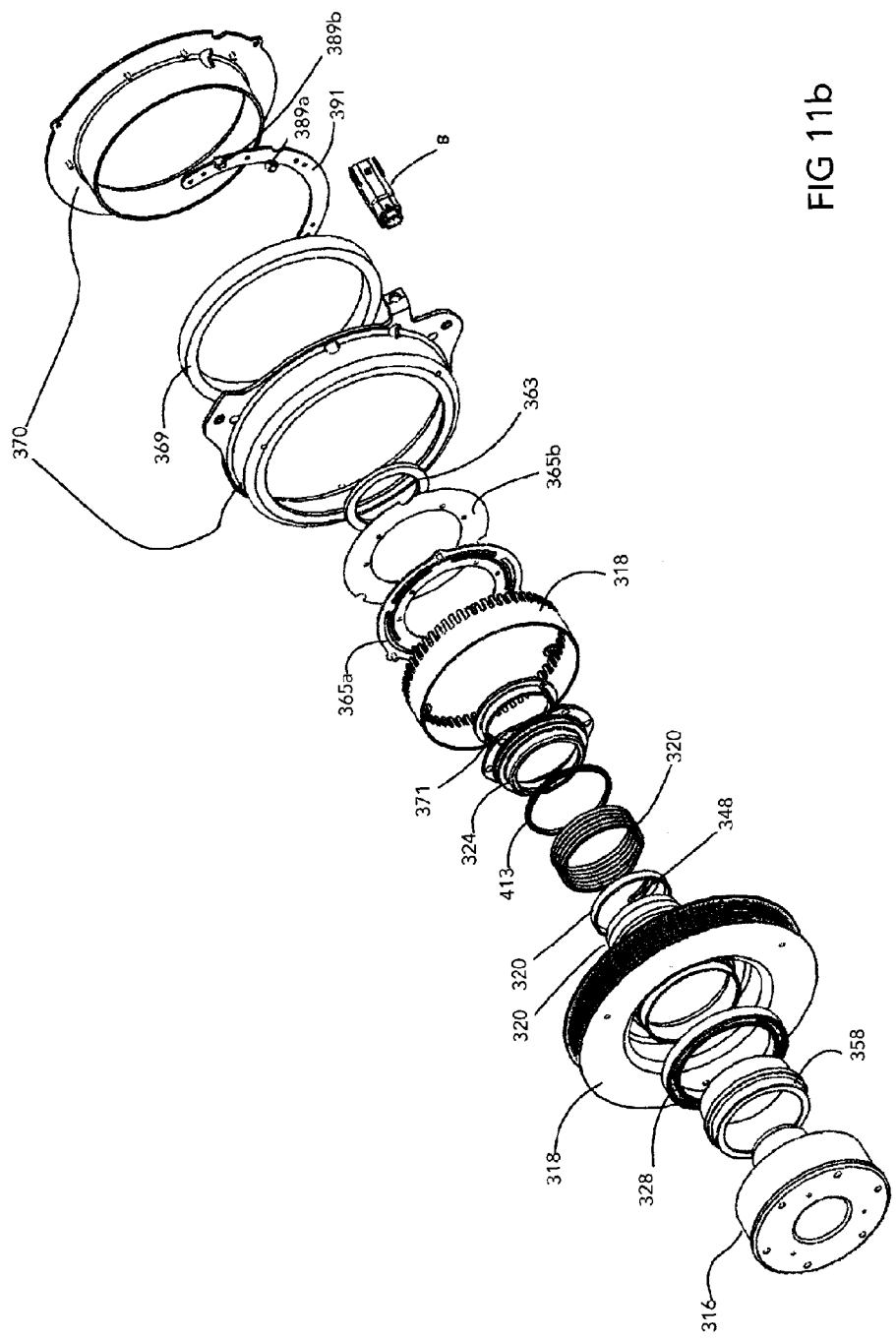

Reference is made to FIGS. 11a and 11b which are exploded views of another embodiment of a clutch assembly shown at 314. The clutch assembly 314 may be similar to the clutch assembly 14 (FIG. 1) but with several differences which are described hereinbelow. In general, the clutch assembly 314 is, in at least some embodiments, configured to permit the transfer of a high amount of torque between a first clutch member 316 (which may be a crankshaft adapter that mounts to a crankshaft 10 shown in FIG. 1) and a second clutch member 318 (which may be a pulley), while also including features to ensure that the engagement of the clutch assembly 314 is controlled (i.e. is not very abrupt unless desired) and that disengagement occurs reliably. It will be noted that, for readability, the first clutch member 316 may be referred to as the crankshaft adapter 316, and the second clutch member 318 may be referred to as the pulley 318. It will be understood, however, that in many instances it is intended solely for readability and that any suitable first clutch member and any suitable second clutch member could be used.

Parts of the clutch assembly 314 that are similar in function to parts of the clutch assembly 14 will have similar reference numerals (amended to include a leading '3'). Accordingly, the clutch assembly 314 includes the crankshaft adapter 316, the pulley 318 which is supported on the first clutch member by a bearing 328, a retainer 358 that holds a carrier 348 that holds a first end 340 of a wrap spring 320, an armature 322 that holds a second end 342 of the wrap spring 320, an actuator 324, an electromagnetic unit 326 that includes an electromagnet 369 and an electromagnetic unit housing 370 that holds the electromagnet 369, and a control system 388. In the embodiment shown, the first clutch member 316 is a crankshaft adapter that mounts to and is driven by the crankshaft 10 (FIG. 2a). A second pulley (analogous to pulley 34 in the embodiment shown in FIG. 1 is not shown in FIGS. 11a and 11b) however such a pulley could optionally be provided.

As with the clutch assembly 14 shown in FIG. 1, energization of the electromagnet 369 causes the armature 322 to engage the pulley 318. Because the armature 322 holds the second end 342 of the wrap spring 320, such engagement between the armature 322 and the pulley 318 causes a shift in the phase angle between the armature 322 and the crankshaft adapter 316, which causes the wrap spring 320 to expand radially and engage the second clutch member 318 thereby engaging the crankshaft adapter 316 with the second clutch member 318. Deenergization of the electromagnet 369 causes the wrap spring 320 to contract radially away from the pulley 318 so as to disengage the crankshaft adapter 316 from the second clutch member 318.

Use of Return Spring on Armature

The armature 322 is provided with a return spring to bring the armature 322 away from the pulley 318 when the electromagnet 369 is deenergized.

As with the armature 22 shown in FIGS. 3a and 3b, the armature 322 (FIG. 11c) is movable between a first position in which the armature 322 is disengaged from the pulley 318 and a second position in which the armature 322 is drawn into engagement with the pulley 318 by a magnetic circuit that passes through the pulley 318 itself. A feature of the armature 322, however, is that it is biased towards the first position by an armature biasing member 365a, which may be, for example, a leaf spring. The armature biasing member 365a is preferably configured to apply a relatively small (e.g. 10N) force on the armature 322 to draw the armature 322 away from the pulley 322 after deenergization of the electromagnet 369. As a result, the armature 322 is inhibited from remaining in contact with the pulley 318 after deenergization of the electromagnet 369 due to residual magnetism in the pulley 318 and armature 322 and/or due to sticking as a result of grease that could be present between them. By eliminating such contact, premature wear on the armature 322 that could result from such contact is avoided.

During use of the clutch assembly 314 the electromagnet 369 may be energized cyclically to control the armature 322 using pulse width modulation as will be described further below. Depending on the frequency of energization, a harmonic may be imparted to the leaf spring 365a such that it is urged to vibrate. To inhibit this vibration, behind the leaf spring 365a (i.e. to the left of the leaf spring 365a in the view shown in FIG. 11c) is a rigid backing plate 365b that abuts the leaf spring 320 to limit movement of the leaf spring 320, thereby helping to stabilize the leaf spring 365a in the event it vibrates.

The armature 322 is connected to the leaf spring 389 via a plurality of rivets 323 that pass through tabs 325 (which are more clearly shown in FIGS. 11a and 11b) on the armature 322. The rivet 323 shown in FIG. 11c is shown as extending through the tabs 325 and the leaf spring 365a and backing plate 365b but is shown prior to spreading of its open end to form a mushroom head.

Figure 11C:
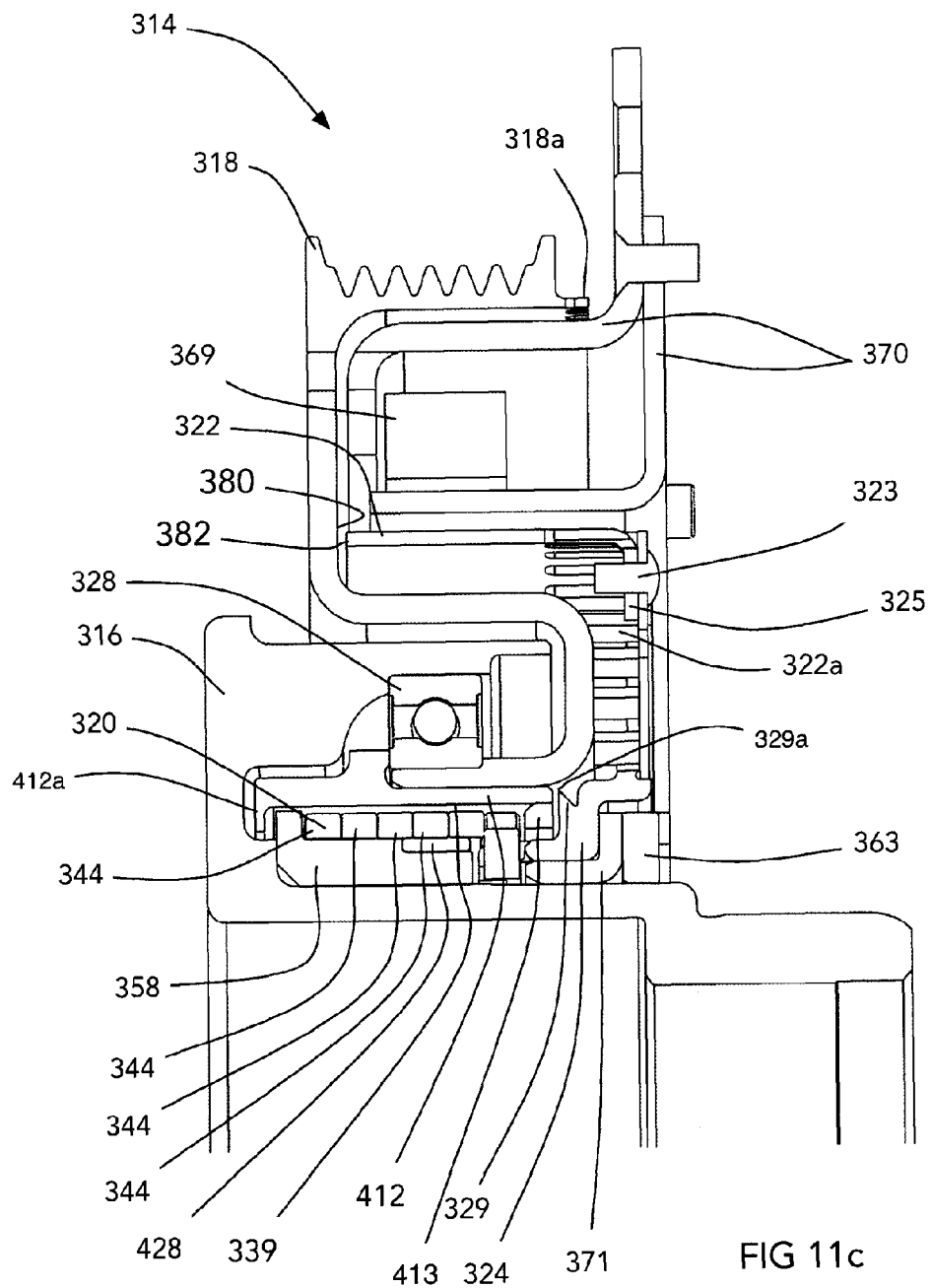
FIG. 11c is a sectional side view of the clutch assembly shown in FIGS. 11a and 11b.

With continued reference to FIG. 11c, the leaf spring 365a and backing plate 365b are mounted to the actuator 324. Such mounting may be by mechanical fasteners 359 (e.g. rivets) (FIG. 11a) which pass through the actuator 324 and further pass through apertures 367a on the leaf spring 365a and apertures 367b on the backing plate 365b.

Referring again to FIG. 11c, the actuator 324 may be made from a (preferably non-magnetic) metal such as aluminum. A bushing 371, which may be made from any suitable material such as DU® provided by GGB North America LLC of New Jersey, USA, is mounted in the actuator 324 and permits the actuator 324 to be rotatably mounted to the crankshaft adapter 316. The actuator 324 has a slot 366 therein that holds the second end 342 of the wrap spring 320. As in the embodiment shown in FIGS. 1-4c, when the armature 322 is drawn into engagement with the pulley 318 friction from the engagement slows the armature 322, and therefore the actuator 324, relative to the crankshaft adapter 316. As a result, the second end 342 of the wrap spring 320 rotates by some amount relative to the first end 340 in a direction that causes the wrap spring 320 to expand radially into engagement with the inner surface shown at 339 of the pulley 318. As can be seen, the inner surface of the pulley 318 is the inner surface of the sleeve 412.

As shown in FIG. 11c, the actuator 324 may include a 'flinger' 329, which is a lip that extends radially outwards towards the wall of the pulley 318. The flinger 329 acts to throw debris radially outwards centrifugally by virtue of the rotation of the actuator 324 if such debris should collect in the clutch assembly 314 during use. The flinger acts as a rough seal by having its distal edge shown at 329a be positioned proximate the wall of the pulley 318 so as to inhibit the entry of debris into the region of the clutch assembly 314 where the wrap spring 320 resides.

An actuator retainer 363 is provided on the crankshaft adapter 316 to prevent withdrawal of the actuator 324 away from the pulley 318. The actuator retainer 363 may be a separate ring that is press-fit or welded or otherwise joined to the crankshaft adapter 316. The actuator retainer 363 acts as a thrust bearing to support the actuator 324 during use of the clutch assembly 314. The bushing 371 may be L-shaped so as to have a portion that acts between the actuator 324 and the actuator retainer 363 to reduce friction therebetween as the actuator 324 rotates relative to the actuator retainer 363 and crankshaft adapter 316. Aside from the provision of the actuator retainer 363 to limit the maximum distance of the actuator 324 from the pulley 318, the actuator 324 may otherwise be permitted to float axially to some extent over a small distance along the crankshaft adapter 316.

The wrap spring 320 may be provided with a relatively large number of coils 344, also referred to as turns, so as to permit a relatively large amount of torque to be transferred through the wrap spring 320 to the pulley 322. However, in general, the abruptness of the engagement between a wrap spring and the driven component (in this case the pulley 318) increases as the number of coils on the wrap spring increases. Accordingly, it is typical to limit to number of coils on a wrap spring in order to control the dynamic torque that will be transferred to the pulley 318 and thus control the stresses incurred by the various components. However it is desirable to provide a large number of coils in applications where the clutch assembly is needed to handle high torque. Alternatively, however, a wrap spring 320 with a relatively small number of coils may also be used in the clutch assembly 314. For example, the wrap spring 320 could have three coils, or even fewer in some embodiments.

The clutch assembly 314 provides a wrap spring 320 with a large number of coils 344 so as to permit high torque transfer, but also includes structure to permit control over the abruptness of the engagement of the wrap spring 320 with the pulley 318.

Use of Sensors and PCB in Electromagnet Housing

Referring to FIGS. 19a and 19b, the low power requirements of the clutch assembly 314 that result from providing the magnetic circuit through the pulley 318 itself permit a control system 388 to be provided with it. The control system 388 is used for controlling the rate of engagement of the wrap spring 320 with the pulley 318, and also to control the amount of torque that can be transferred through the wrap spring 320 to the pulley 318 during operation. The control system 388 includes a PCB with processor and memory, sensors and a driver, so as only to require a connection to the vehicle's data bus (in embodiments wherein data is sent to and from the control system 388 via a wired connection), and a power connection to the vehicle's battery (not shown). In some embodiments however, data may be sent to and from the control system 388 wirelessly via any suitable wireless protocol such as Zigbee. Also, in some embodiments, the control system may be housed in the housing shown at 370 for the electromagnet 369. Room for the control system exists in part because the size of the electromagnet 369 can be small compared to the electromagnet used on some typical clutches which require more power to operate, and in part because the size (the axial length specifically) of the electromagnet housing 370 may be dictated to some extent so as to provide a certain amount of axial overlap with the pulley 320. The smaller size of the electromagnet 369 is enabled because of the greater efficiency of the magnetic circuit in the clutch assembly 314 than in some clutch assemblies of the prior art. For example, in some clutch assemblies the magnetic flux travels from the electromagnet, across a gap to a pulley, across the pulley (axially), across another gap to a friction plate, radially across the friction plate, back across the second gap to the pulley again, and then back across the first gap to the electromagnet. The many air gaps necessitate the use of a relatively large electromagnet. Additionally, some of the magnetic flux short circuits through the pulley radially and back into the electromagnet and does not reach the friction plate again necessitating a large electromagnet to account for the lost power. By comparison, the magnetic circuit of the clutch assembly 314 (and the other clutch assemblies described herein) has an air gap between the electromagnet housing 370 and the pulley from the pulley 320 to the armature 322 and from the armature 322 back into the housing 370, thereby reducing the number of air gaps that must be crossed. As a result a smaller electromagnet can be used to drive the magnetic circuit, and provides a space inside the housing 370 for the PCB 391 and other components of the control system 388.

Providing the control system 388 in this way permits the clutch assembly 314 to be more likely to be capable of incorporation into a vehicle using the existing ECU for the vehicle. Also, this arrangement keeps the clutch assembly 314 relatively compact.

The armature 322 and the pulley 318 of the clutch assembly 314 each have a plurality of teeth 322a and 318a respectively thereon. Two Hall effect sensors 389 (one sensor 389a and one sensor 389b) detect the passage of the teeth 322a and 318a respectively. The control system 388 includes a PCB (printed circuit board) 391 that contains a processor 393, a memory 395 and a driver 397 for providing current to the electromagnet 369. The processor 393 receives signals from the sensors 389a and 389b and can determine, among other things, the speeds and accelerations of the pulley 318 and armature 322 and the phase angle between the crankshaft adapter 316 and the armature 322. Using this data, the control system 388 can control the expansion of the wrap spring 320 and therefore the engagement force between the wrap spring 320 and the inner surface 339 of the pulley 318. It will be understood that the armature 322 is connected rotationally with the actuator, and so the actuator 324 and the armature 322 have the same rotational speed, acceleration and phase angle.

As with the other embodiments shown and described, by generating a magnetic loop through the armature 322, the electromagnet housing 370 and the pulley 318, the amount of power required is relatively small. This permits the use of a relatively low power driver (i.e. driver 397), which, in turn, facilitates mounting the driver 397 directly on the PCB 391 and eliminates the need for additional relays as described above in relation to the embodiment shown in FIGS. 1-4c. Additionally, the sensors 389a and 389b may both be mounted directly on the PCB 391. Providing the PCB 391, processor 393 and memory 395 as part of the clutch assembly 314, with the driver 397 and sensors 389a and 389b mounted directly on the PCB 391 eliminates all of the wiring (and associated electrical connections) that would otherwise be provided between these components if they were remote from each other. By eliminating wiring between the sensors 389a and 389b and the PCB 391, the potential for external noise to interfere with the sensor signal to the PCB 391 is eliminated. Additionally, the potential for poor signal transmission resulting from bad electrical connections is greatly reduced since the number of individual electrical connections between the PCB 391 is lower than it would be for a remotely located control unit. Also, by providing the driver 397 and the rest of the control system 388 with the clutch assembly 314, each control system 388 can be calibrated specifically for use with the components of the specific clutch assembly 314 that it forms part of. By contrast, with some other clutch assemblies, the driver and the control system are part of the ECU for the engine and are thus separated from the clutch assembly itself. As a result, during vehicle assembly, it is entirely possible for the engine ECU to require replacement if it is found to be defective, in which case, the calibration may have to be redone anew upon installation of the new ECU. By mounting the control system 388 directly with the clutch assembly 314, the calibration can be done and if the engine ECU requires swapping out, it will not affect the calibration of the control system 388. In addition to the above, eliminating the electrical connections that are necessary when connecting two remote components with wires eliminates many potential sources of failure, since each connection represents a potential weak point that can be severed during use (or poorly manufactured). As yet another advantage, some manufacturers manufacture families of engines with different units having different levels of performance. For example, an engine family may include models that lack a supercharger and models that include a supercharger. The engine ECU is typically unchanged across the engine family. If the engine ECU also housed the driver and other components for the clutch assembly, then it would typically be provided by the manufacturer for all models of the engine, including those that lack a supercharger, resulting in additional cost with no benefit. By contrast, by providing the control system 388 with the clutch assembly, the clutch assembly 314 is self-contained, and the driver and control system components need only be provided on engines that include the supercharger.

Because of the low power requirement of the electromagnet 369, the driver 397 may draw relatively little power from the vehicle's battery (not shown). The relatively low power draw results in relatively low heat generation by the driver 397. Additionally, the electromagnet 369 itself also generates relatively little heat as compared to a larger electromagnet that is used on some clutch assemblies such as some friction plate clutch assemblies. For example, the current draw for some clutch assemblies is between 4 and 5 Amps. By contrast, the current draw on some embodiments of the clutch assembly 314 may be about 1 Amp. Assuming the same voltage source is used (the vehicle battery), the power consumed by the clutch assembly 314 is, in some embodiments, significantly lower than some other clutch assemblies. Because of the reduced size of the electromagnet 369 compared to higher power electromagnets needed for other clutch assemblies, and because of the reduced heat generation by both the electromagnet 369 and the driver 397, it is possible to locate the control system 388 within the electromagnet housing 370 without generating an unduly large amount of heat in the housing 370. By contrast, in some other clutch assemblies, even if there were room to store the control system within the electromagnet housing, so much heat would be generated that it could result in a reduced operating life for some of the control system components. As shown in FIGS. 19a and 19b, the PCB 391 is positioned in the electromagnet housing 370. By positioning the control system 388 (and the PCB 391 in particular) in the housing 370, it is protected from mechanical damage and from the elements to some extent without the need to provide a separate dedicated enclosure for it. This reduces the cost associated with it and reduces the amount of room occupied by the clutch assembly 14.

While it is shown for the control system 388 to be housed in the electromagnet housing 370, it will be understood that the control system 388 could, in some embodiments, be housed in a separate, dedicated housing.

Aside from the above noted components, the PCB 391 may have thereon, a voltage monitoring unit 381, a CAN message translator 383, a PWM module 385, and a current monitoring unit 387. The CAN message translator 383 is used to receive and send messages from and to the vehicle's CAN bus 399. The PWM module 385 is used to generate the PWM signal that is sent to the driver 397 to control the current sent to the electromagnet 369.

Figure 13:
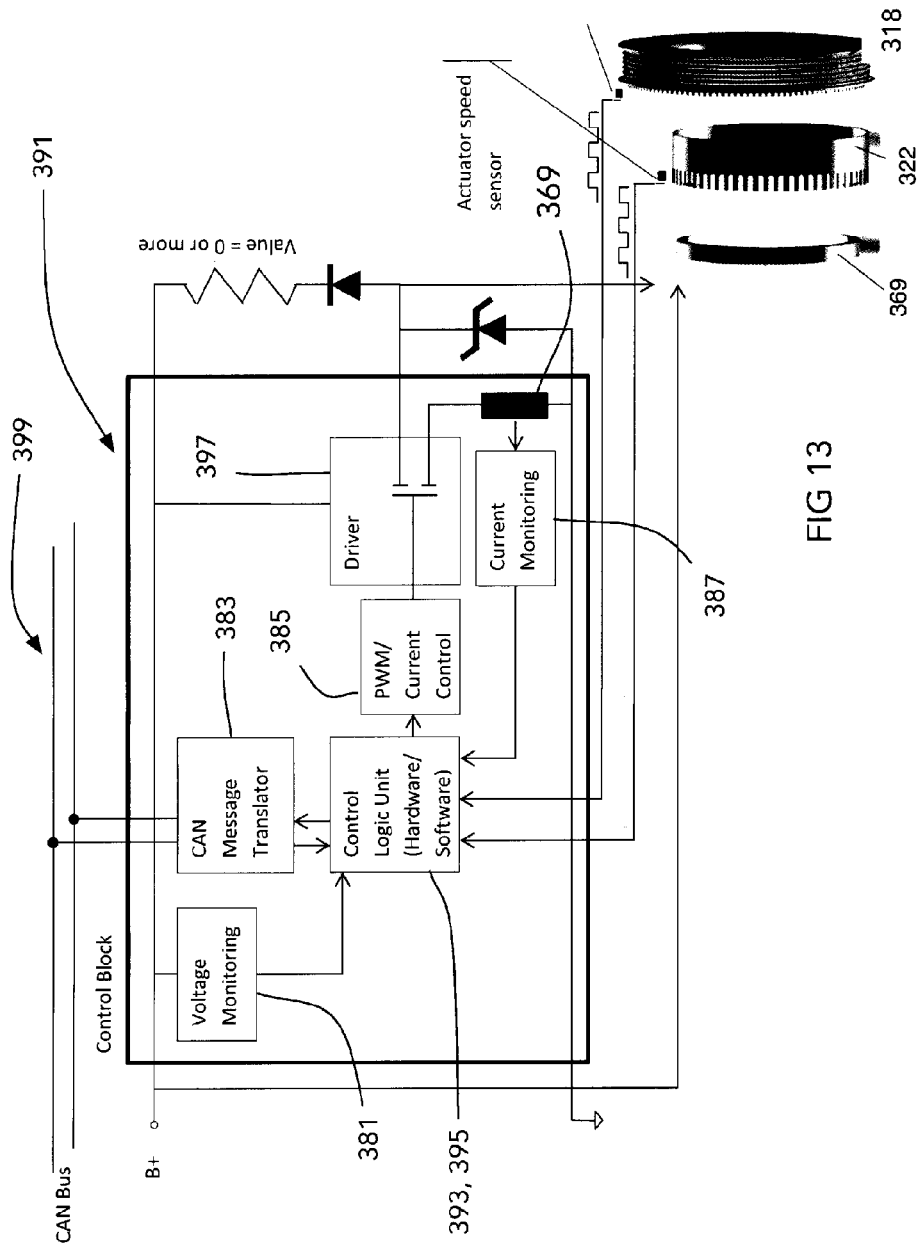
FIG. 13 is a schematic diagram of a portion of the control system.

While the CAN message translator 383 is shown as having a wired connection to the vehicle's CAN bus in FIG. 13, it will be noted that it is possible to provide a wireless communications device instead of the wired CAN message translator 383, as mentioned above.

Instead of a CAN message translator, an analogous device configured to communicate over a different type of network (e.g. LIN) may be used.

The control system 388 may include any suitable additional components to assist in the deenergization of the electromagnet 369 in a controlled way, such as, for example, a Zener diode and/or other diodes as shown in FIG. 13.

Control Algorithm

Figure 14B:
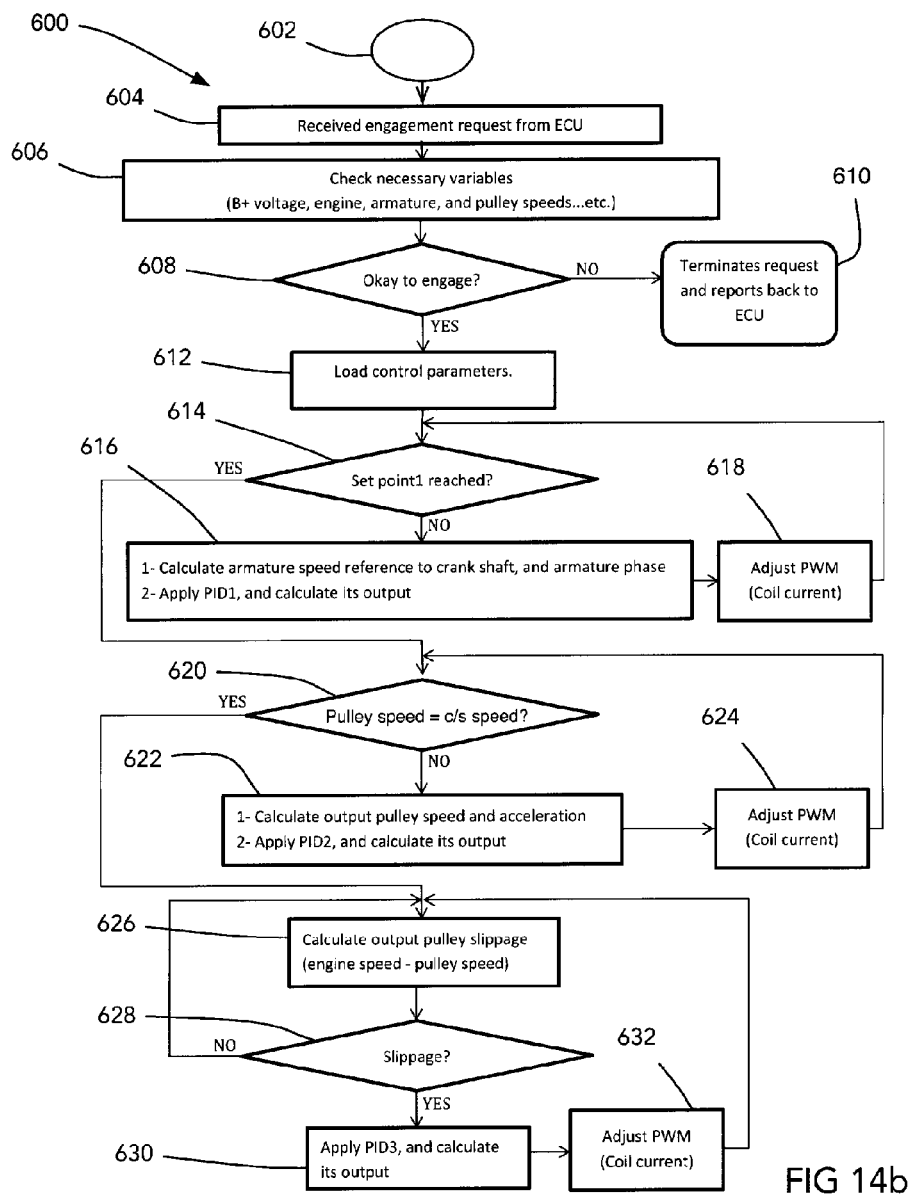

The control algorithm used by the control system 388 is illustrated as a block diagram in FIG. 14a which illustrates the inputs and outputs to different portions of the algorithm, and as a flow diagram in FIG. 14b to show the method steps taken when carrying out the algorithm. The algorithm may also be referred to as a method. Referring to FIG. 14b, the method is shown at 600 and begins at 602. At step 604, the control system 388 receives commands from the engine ECU (not shown) as to whether to engage the clutch 314 or not, via the vehicle's data bus (e.g. a CAN bus) shown at 399. At step 606 selected parameters are checked, relating to the state of the engine, the speed of the pulley 318, the voltage at the vehicle's battery (not shown) and any other suitable parameters. At step 608, the control system 388 determines whether it is okay to engage the clutch 314, based on the parameters that were checked. For example, if the battery did not have sufficient charge to maintain the necessary current to the electromagnet 369 for a sufficient amount of time, then the processor 383 may determine that it is not okay to engage the clutch. If the determination is 'no', then at step 610, the control system 388 reports to the engine ECU (not shown) that the clutch 314 will not be engaged.

The control algorithm used by the control system 388 permits fast or slow engagement of the wrap spring 320 with the pulley 318 when desired based on a set of selected parameters. The command from the engine ECU may also specify whether a fast or slow engagement is needed. The control algorithm incorporates closed loop feedback so as to permit control of the engagement of the wrap spring 320. Such feedback may be provided from dedicated sensors, or from data from preexisting sensors in the vehicle, received via the vehicle's data bus.

Figure 12A:
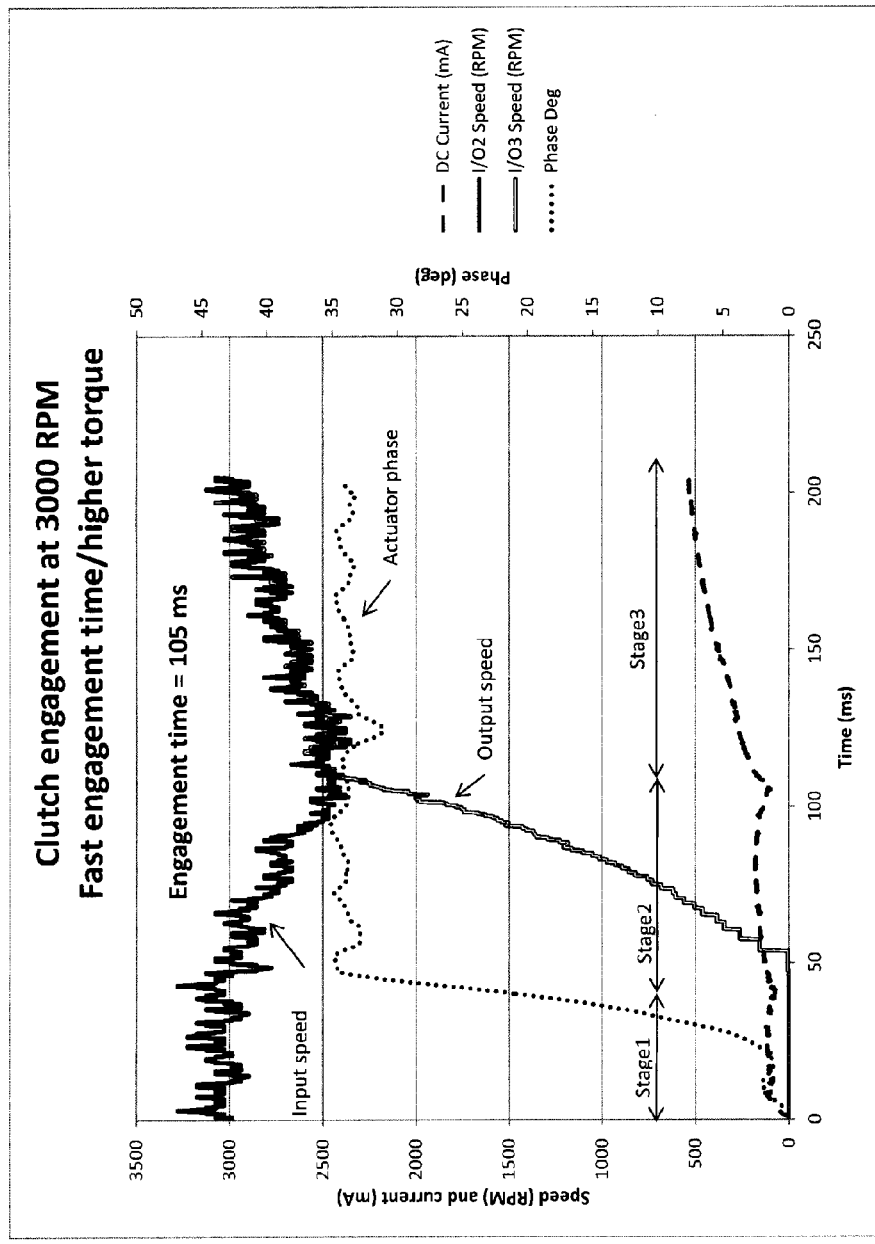
FIGS. 12a and 12b are graphs illustrating data relating to components of the clutch assembly shown in FIGS. 11a and 11b that can be achieved using a control system for the clutch assembly.
Figure 12B:
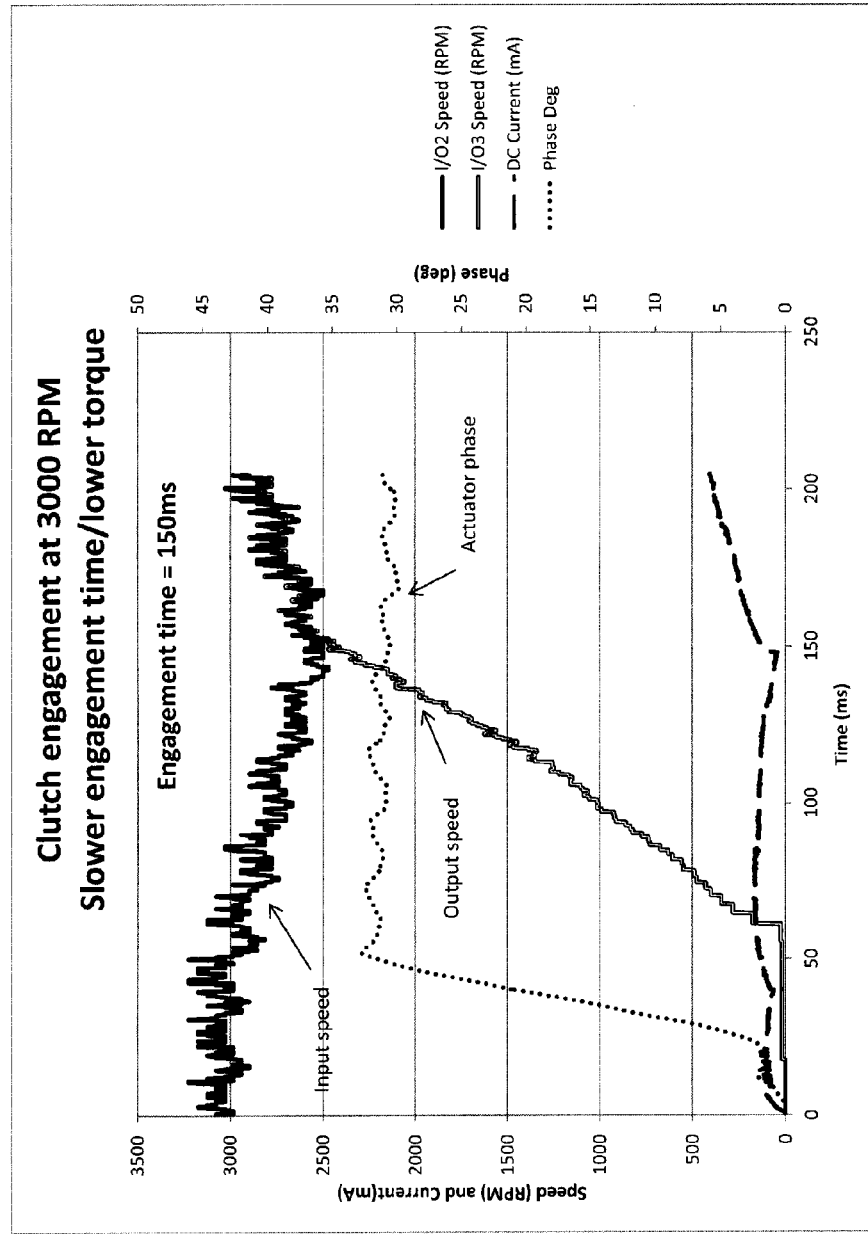

The control system 388 can provide a relatively fast ramp up time for the engagement between the wrap spring 320 and the pulley 318 in some situations (which is illustrated in FIG. 12*a*), and can provide a relatively long ramp up time for the engagement in some situations (illustrated in FIG. 12*b*).

In general, the current supplied to the electromagnet 369 results in an electromagnetic force between the armature 322 and pulley 318 and thereby controls the force of engagement between the armature 322 and the pulley 318 which is proportional to the torque exerted between the armature 322 and the pulley 318 (via frictional engagement between their mutually facing surfaces shown at 382 and 380 respectively in FIG. 11*c*). The torque applied retards the armature 322 relative to the crankshaft adapter 316. Because the second end 342 of the wrap spring 320 is captured by the actuator 324, the retardation of the armature 322 results in a radial expansion of the wrap spring 320. This is resisted by the restoring force of the wrap spring 320 which biases the wrap spring 320 back towards an unexpanded state. As the wrap spring 320 expands, the restoring force increases. Thus from any given position, an increase in the torque applied to the wrap spring 320 results in an increase in the amount of expansion until the restoring force results in a resistive torque that matches the torque applied it. Based on the above, it can be seen that the force of engagement between the armature 322 and the pulley 318 is proportional to the amount of expansion of the wrap spring 320. Furthermore, because the current applied to the electromagnet 369 is proportional to the force of engagement, then it will be understood that the current is proportional to the amount of expansion of the wrap spring 320. It will also be noted that the amount of expansion of the wrap spring 320 determines the angular displacement (also referred to as the phase angle) between the first end 340 and the second end 342. Thus, by controlling the current to the wrap spring 320, the phase angle between the first and second ends 342 of the wrap spring 320 can be controlled and the amount of expansion of the wrap spring 320 can be controlled.

The control algorithm 600 shown in FIGS. 14*a* and 14*b* may have three stages of operation. In Stage 1, the current to the electromagnet 369 is controlled so as to bring the actuator 324 and armature 322 to a selected relative angular displacement or phase angle relative to the crankshaft adapter 316. This selected phase angle may be represented by set point SP1, which may be a value that is stored in memory 395. SP1 may be selected to be the phase angle at which the wrap spring 320 has expanded just enough to engage the inner surface of the pulley 318. In some embodiments, SP1 may be a fixed value that is stored in memory 395. At step 612 (FIG. 14*b*), the values for the actuator speed and the crankshaft speed are obtained, and the actual phase angle is determined using these values. When the wrap spring 320 reaches the selected phase angle SP1, friction and thus torque transfer between the coils of the wrap spring 320 and the pulley 318 are low. In some instances, SP1 may be somewhere in the range of about 30 to about 50 degrees. In general, for a wrap spring that is longer (i.e. that has more coils), the greater the phase angle that will be needed to cause it expand by a selected amount. As shown in FIG. 14*b*, the process of reaching set point 1 is achieved by a loop that includes steps 614, 616 and 618. At step 614 the control system 388 (FIG. 11*c*) checks whether the set point SP1 has been reached. If the set point SP1 has not been reached then step 616 (FIG. 14*b*) is carried out in which the control system 388 (FIG. 11*c*) generates a new value for the current to send to the electromagnet 369. At step 618 (FIG. 14*b*) the current sent to the electromagnet 369 (FIG. 11*c*) is adjusted towards the new value. Control is then sent back to step 614 (FIG. 14*b*) where the control system 388 checks if the actual phase angle of the actuator 324 (FIG. 11*c*) matches the set point value SP1. If it is determined that the phase angle does equal the value for SP1, then the control system 388 sends control to step 620 (FIG. 14*b*), at which point stage 2 of the algorithm 600 begins.

At step 616 a PID control formula may be used. Feedback for the PID control formula may be provided by the integral of the speed difference between the actuator 324 (FIG. 11*c*) and the crankshaft adapter 316, which will be understood to be indicative of the phase angle between the armature 322 and the crankshaft adapter 316. Because the crankshaft adapter 316 is mounted on the crankshaft 10 (FIG. 2*a*), the crankshaft speed is the same as the crankshaft adapter speed. The crankshaft speed may be obtained by any suitable means, such as by communication with existing controllers on the vehicle via the vehicle's CAN bus 399 (FIG. 13). The value for the current generated from step 616 (FIG. 14*b*) is transmitted to the PWM module 385 (FIG. 13), which outputs a pulse width modulated signal to the driver 397, which in turn controls the current to the electromagnet 369 based on the signal from the PWM module 385. Once the selected phase angle SP1 is achieved, stage 2 of the algorithm is carried out.

In stage 2 of the algorithm the expansion of the wrap spring 320 (FIG. 11*c*) is increased in a controlled way to control the acceleration of the pulley 318. In this stage another PID formula may be employed (or alternatively any other control formula). The set point for this control routine is represented by SP2 and is an acceleration value. Feedback is provided for this control routine by determining the actual acceleration of the pulley 318 and comparing it to the set point SP2. The actual acceleration may be determined by measuring the speed of the pulley 318 using the Hall effect sensor 389*b* (FIG. 19*b*), and by taking the derivative of the measured speed. Once a selected amount of torque is being transferred from the wrap spring 320 (FIG. 11*c*) to the pulley 318, the algorithm may proceed to Stage 3. The expansion of the wrap spring 320 is still controlled by controlling the phase angle between the armature 322 and the crankshaft adapter 316 and so the phase angle is also an input to the algorithm during stage 2. In other words, in stage 2, the control system 388 controls the phase angle between the armature 322 and the crankshaft adapter 316 to achieve a selected acceleration for the pulley 318. The set point SP2 may ultimately be derived by receiving a torque value from the engine ECU (not shown) and then using that value to find the set point SP2 from a look up table stored in memory 395. Stage 2 of the algorithm is carried out until the pulley 318 has reached the engine speed, (i.e. until the crankshaft adapter 316 and the pulley 318 have the same speed). Once the control system determines that pulley speed matches the engine speed, stage 3 of the algorithm is carried out.

With reference to FIG. 14b, stage 2 includes a loop that includes steps 620, 622 and 624. At step 620, it is determined whether the pulley speed matches the crankshaft speed. If it does not, step 622 is carried out in which a control formula is applied (e.g. a PID control formula) to provide a new value for the current to the electromagnet 369 (FIG. 11c) in order to adjust the acceleration of the pulley 318 towards the set point SP2. At step 624 (FIG. 14b), the current sent to the electromagnet 369 (FIG. 11c) is adjusted towards the new value. Control is then sent back to step 620 (FIG. 14b) where the control system 388 (FIG. 11c) checks whether the pulley speed matches the crankshaft speed. If it is determined that the pulley speed matches the crankshaft speed, then the control system 388 sends control to step 626 (FIG. 14b), at which point stage 3 of the algorithm 600 begins.

In stage 3 of the algorithm, the control system 388 maintains the holding torque achieved at the end of stage 2 so as to prevent slippage between the wrap spring 320 and the pulley 318. In this stage, the control system 388 obtains the speeds of the pulley 318 and the crankshaft 10 (FIG. 2a) and compares them to determine if any slippage is occurring between them, which would be indicative of slippage between the wrap spring 320 and the pulley 318. If slippage is detected, the control system 388 increases the current to the electromagnet 369 to increase the expansion of the wrap spring 320, thereby increasing the force of engagement between the wrap spring 320 on the pulley 318 so as to increase the amount of torque that can be transferred to the pulley 318 without slippage. Alternatively, if no slippage is detected, the control system 388 may reduce the current by some amount while continuing to determine whether there is slippage. In this way, the control system 388 dynamically adjusts the current sent to the electromagnet 369 to keep the current to a relatively low level while ensuring that the torque requirements for the clutch assembly 314 are being met. The three stages of operation of the algorithm are identified in FIGS. 12a and 12b (shown at Stage 1, Stage 2 and Stage 3). References to input speed and output speed in these two figures are intended to refer to the speed of the crankshaft and of the pulley 318 respectively.

With reference to FIG. 14b, stage 3 includes a loop that includes steps 626, 628, 630 and 632. At step 626, the amount of slippage is determined between the pulley (FIG. 11c) and the crankshaft 10 (FIG. 1). At step 628 it is determined whether the determined slippage value constitutes slippage (i.e. it is determined whether it is non-zero). If it is non-zero, step 630 is carried out in which a control formula is applied (e.g. a PID control formula) to provide a new value for the current to the electromagnet 369 (FIG. 11c) in order to adjust the engagement force between the wrap spring 320 and the pulley 318 so as to reduce the amount of slippage towards zero. At step 632 (FIG. 14b), the current sent to the electromagnet 369 (FIG. 11c) is adjusted towards the new value. Control is then sent back to step 626 (FIG. 14b) where the control system 388 (FIG. 11c) checks whether any slippage is occurring. If it is determined that there is no slippage (i.e. the pulley speed matches the crankshaft speed), then at step 628 (FIG. 14b) control is sent back to step 626 (FIG. 14b). Operation in stage 3 continues until the electromagnet 369 (FIG. 11c) is deenergized.

Thus by providing the algorithm 600 described above, the clutch assembly 314 can be configured to permit high torque transfer to the pulley while still permitting the stresses and dynamic torques incurred by the components of the assembly 314 to be limited in situations where such limits are beneficial and to also permit very short ramp up times for the pulley 318 in situations where short ramp up times are desired. Short ramp up times, for example, may be desired during passing maneuvers where the pulley 318 is being used to drive a belt that ultimately drives a supercharger, thereby providing power quickly to the vehicle. Longer ramp up times may be desired where a short ramp up time is not needed and would produce unacceptably high levels of noise or other problems such as high stresses.

It will be noted that the use of the algorithm described above is not limited to a clutch assembly with a wrap spring with many coils, nor to a clutch that drives a magnetic loop through the body of the pulley. It is applicable to other types of clutch that incorporate a wrap spring.

It will be further noted that the algorithm need not include all three stages. For example, the algorithm could start with stage 2, whereby the control system 388 continues to control the current to the electromagnet 369 until a selected acceleration is achieved (i.e. until the acceleration reaches SP2). In such a scenario there would simply be an initial period during which the control system 388 sends current to the electromagnet but with no resulting acceleration in the pulley 318. The control system 388 could compensate for this in some suitable way such as by delaying the application of Stage 2 by a certain period of time to give the armature 322 time to approach the pulley 318. While it is described that stage 1 may be effectively omitted, it will be noted that the algorithm could contain any one or any two of the three stages independent of whether the other stages are included. Preferably all three stages are included, however.

While two speed sensors 389a and 389b are described it will be noted that at least one of the stages, and in some instances all of the stages of the above described algorithm may be carried out even if one or both of the sensors 389a and 389b are omitted. For example, stage 2 could be carried out solely using the pulley speed sensor 389b (i.e. without an armature speed sensor). For example, the control system 388 could use the pulley speed sensor 389b to determine the pulley acceleration and could control the current to the electromagnet 369 to achieve the selected acceleration. The control system 388 can then compare the pulley speed to the crankshaft speed and can stop stage 2 when the two speeds match. Alternatively, if a speed sensor is provided on the driven accessory (e.g. the supercharger) then that speed sensor can be used to determine the speed of pulley 318 based on a ratio of the sizes of pulley 318 and the accessory drive pulley. Thus, stage 2 could be carried out without either of the sensors 389a and 389b.

High Torque Capacity Pivoting Carrier

Another feature of the clutch assembly 300 is that the carrier 348 and its engagement with the retainer 358 permit the transfer of high torque without deformation of these two components and reduce the stresses in these components relative to a typical carrier. To achieve these advantages, the carrier 348 is, in at least some embodiments, pivotable relative to the retainer 358.

Figure 15A:
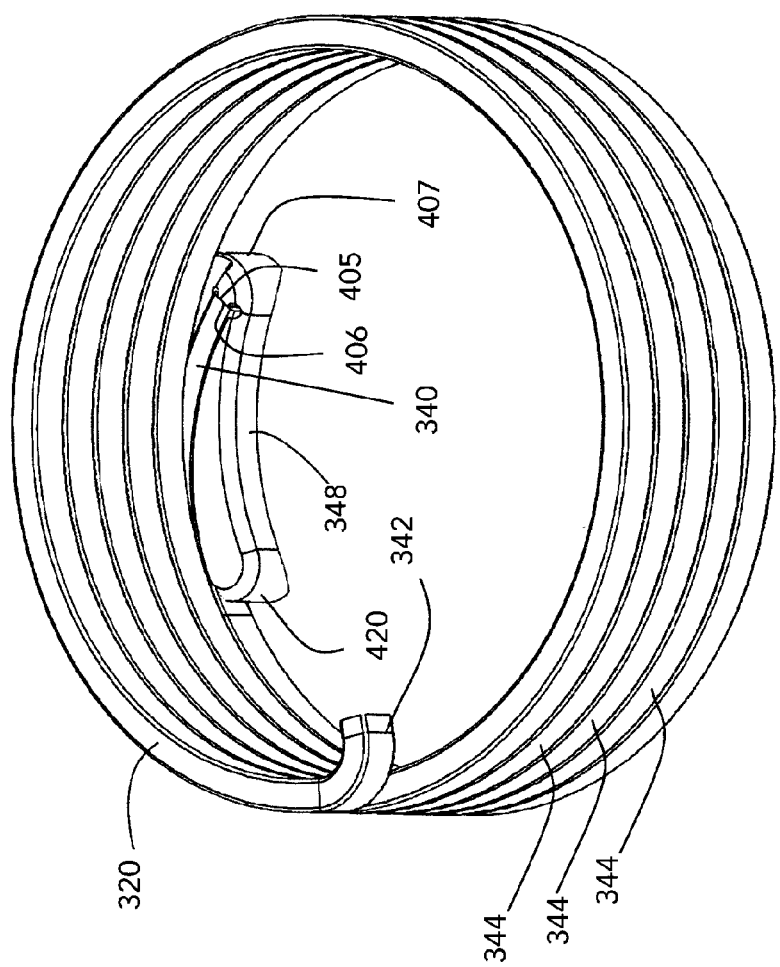

The carrier 348 is shown more clearly in FIGS. 15a and 15b. The carrier 348 may be made from a metallic material such as a suitable steel, such as a 1045 carbon steel or a 4340 alloy steel, although other materials are contemplated.

The carrier 348 includes a spring receiving slot 402 for receiving the first end 340 of the wrap spring 320 such that a helical end face 405 of the wrap spring 320 engages a drive wall 406 at the end of the slot 402. The first end 340 of the wrap spring 320 (and the slot 402) may have any suitable shape such as an arcuate shape. The wrap spring first end 340 may be press-fit into the slot 402 so that there is sufficient friction between the first end 340 and the slot 402 to prevent withdrawal of the first end 340 from engagement with the drive wall 406 during moments when the pulley 318 overruns the crankshaft 10. The wrap spring first end 340 may alternatively be welded into the slot 402.

Figure 4C:
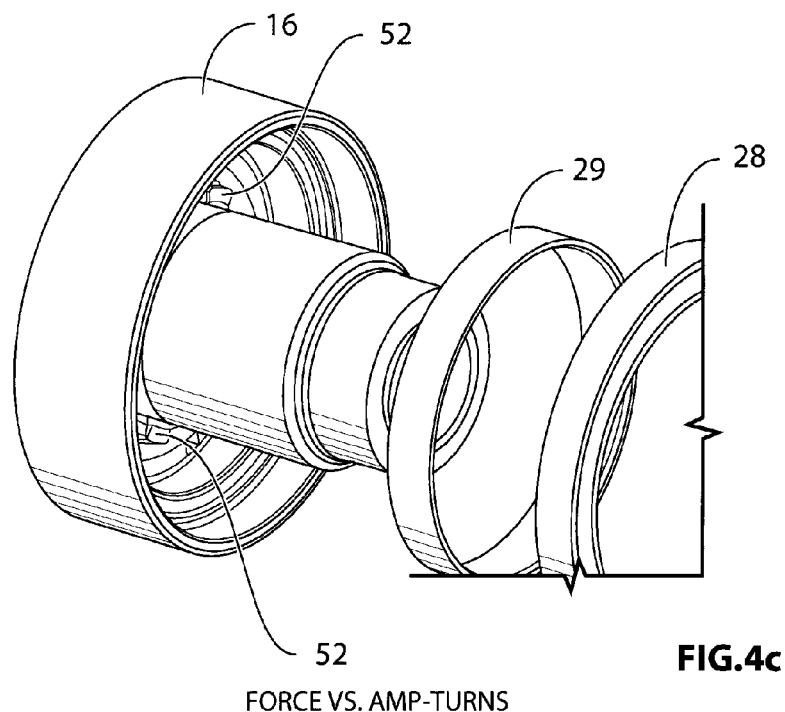
Figure 16:
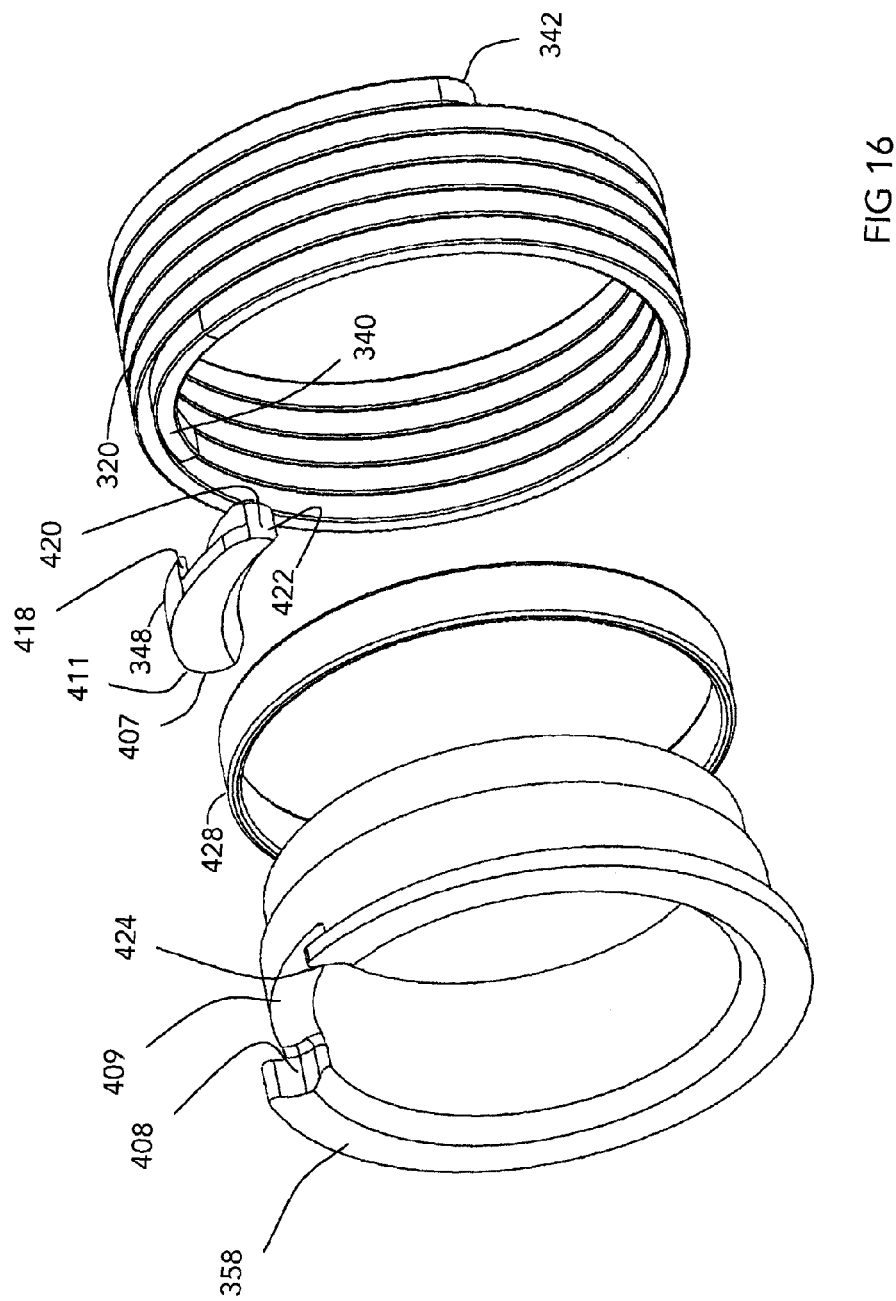
FIG. 16 is an exploded perspective view of some of the components of the clutch assembly shown in FIGS. 11a and 11b.
Figure 17:
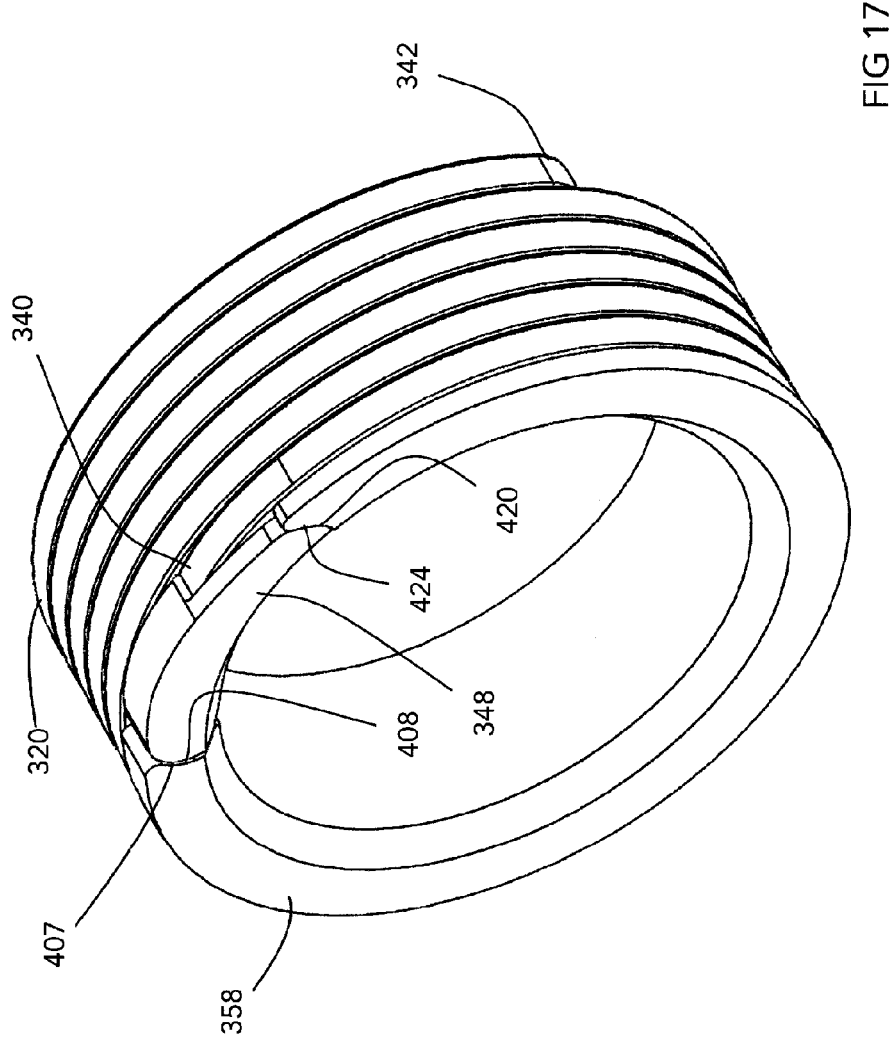
FIG. 17 is a perspective view of the components shown in FIG. 16.

The carrier 348 is positioned in an opening 409 in the retainer 358. The carrier 348 has a torque transfer surface 407 at a first end 411, which engages a torque transfer surface 408 on the retainer 358 (which is at a first end of the opening 409). As in other embodiments, the retainer 358 may be press-fit onto the crankshaft adapter 316 so as to co-rotate with the crankshaft adapter 316. As a result of this arrangement, torque from the crankshaft adapter 316 is transferred to the carrier 348 via the torque transfer surfaces 407 and 408, and from the carrier 348 to the wrap spring 320 via engagement of the drive wall 406 with the helical end face 405 of the wrap spring 320. This is a different arrangement from that which is shown in FIGS. 4b and 4c in which the lug 52 on the first clutch member 16 directly engages the helical end face 20a of the wrap spring 20. The torque transfer surfaces 407 and 408 (FIG. 16) have larger surface areas of contact with one another compared to the surface area of contact between the lug 52 (FIG. 4c) and the helical end face shown at 20a (FIG. 4a) of the wrap spring 20 that the lug 52 engages. The larger surfaces areas permit the retainer 358 to transfer a large amount of torque into the wrap spring 320 without a risk of damage to the retainer 358 from the helical end face 405 of the wrap spring 320. While the surface area of contact between the carrier 348 and the helical end face 405 of the wrap spring 320 may be similar to that between the lug 52 (FIG. 4c) and the end face of the wrap spring 20 (and smaller than that between surfaces 407 and 408), the carrier 348 may be made from a suitably strong material to avoid deformation during torque transfer relatively inexpensively as compared to forming the entire retainer 358 out of a similar material.

As can be seen in FIGS. 16, 17, 18a and 18b, the surfaces 407 and 408 may be arcuate so as to permit pivoting of the carrier 348 relative to the retainer 358. When the wrap spring 320 is radially contracted the carrier 348 may have a first orientation relative to the retainer 358 as shown in FIG. 18a. When the wrap spring 320 is radially expanded so as to engage the radially inner surface 339 of the pulley 318 the carrier 348 can pivot radially outwardly to a second orientation relative to the retainer 358 as shown in FIG. 18b. As can be seen, by permitting the pivoting of the carrier 348, only a relatively small length of the wrap spring 320 is unsupported between the carrier 348 and the surface of the pulley 318. This length is shown at LU. This unsupported length LU is smaller than it would be if the carrier 348 were fixed in position and unable to pivot. By providing a relatively small unsupported length of wrap spring, the wrap spring 320 is able to transmit relatively large torques without buckling.

Additionally, it will be noted that, during use, the torque exerted by the retainer 358 on the end face 405 of the wrap spring 320 does not act at exactly the same radius as the torque acting between the wrap spring 320 and the pulley 318, which acts on the radially outer surface of the wrap spring coils. If the carrier 348 was a fixed (i.e. non-pivoting) carrier and remained in the position shown in FIG. 17a, the outer corner (shown at 418) of the slot 402 that holds the wrap spring 320 could impinge upon (and therefore stress) the wrap spring 320 where the wrap spring 320 leaves the slot 402 and extends outwardly towards the inner surface 339 of the pulley 318. As a result a stress could be incurred on the first end 340 of the wrap spring 320 where it bends around the outer corner 418. Such a stress can be cyclical as the wrap spring repeatedly stops and starts transferring torque from the crankshaft 10 to the pulley 318, raising the risk of fatiguing the first end 340 of the wrap spring 320. By permitting the carrier 348 to pivot, the carrier 348 can pivot so that the corner 418 of the slot 402 is moved out of the way of the first end 340 to permit the first end 340 to extend radially outwards towards the enlarged diameter without impinging on the carrier 348. While it may be preferred in some embodiments to provide a pivoting carrier 348, it will be noted that in some embodiments a fixed carrier may nonetheless be used where the stresses incurred by the wrap spring 320 do not lead to an unacceptably short service life.

Thus, the pivoting capability of the carrier 348 permits larger torques to be transferred by the clutch assembly 314. The torque transfer surface 407 may, for example, be a convex, generally part-cylindrical surface and the complementary torque transfer surface 408 on the retainer 358 may, for example, be a concave, generally part-cylindrical surface, although other shapes for the surfaces 407 and 408 may be used. Providing arcuate and preferably part-cylindrical torque transfer surfaces ensures that the forces transmitted between the retainer 358 and the carrier 348 are transmitted across a relatively large surface area even when the carrier 348 is pivoted in different orientations.

When the electromagnet 369 is deenergized so that the wrap spring 320 contracts radially away from the inner surface 339 of the pulley 318, a guide surface 420 at the second end of the carrier 348 (shown at 422) engages a guide surface 424 at a second end of the opening 409 such that the surfaces exert a force on one another. The shape of the guide surface 424 is selected so that it drives the second end 411 of the carrier 348 to rotate radially inwardly, thereby bringing the end 344 of the wrap spring 320 away from the inner surface 339 of the pulley 318. In other words the guide surface 420 at the second end 422 of the carrier 348 cooperates with the guide surface 424 at the second end of the opening 409 to cause a radially inward rotation of the carrier 348 to bring the end 344 of the wrap spring 320 away from the inner surface 339 of the pulley 318. Thus these surfaces 420 and 424 assist in causing radial contraction of the wrap spring 320 when such contraction is desired.

It will be noted that the metallic carrier 348 and its pivotal arrangement with the retainer 358 may be applicable to other clutch assemblies. For example, the carrier 348 and the pivoting arrangement may be used on clutch assemblies where a magnetic circuit does not pass through the pulley itself, such as the clutch assembly shown in US patent publication number 2010/0122882 or in PCT patent publication number WO2012135942A1, both of which are incorporated herein by reference. The carrier 348 and its pivoting arrangement may also be incorporated in other clutch assemblies that do not involve a magnetic circuit at all, such as in a decoupler, such as the decoupler disclosed in U.S. Pat. No. 7,618,337. It will be understood that a separate retainer that mounts fixedly to a first clutch member is not necessary. The first clutch member itself may have an arcuate torque transfer surface for engaging the carrier 348. Furthermore, the torque transfer surface on the carrier 348 may be a concave surface instead of a convex surface and the torque transfer surface on the first clutch member or retainer may be a convex surface instead of a concave surface.

Use of a Pulley Sleeve in the Pulley

Another feature of the clutch assembly 314 is that the pulley 318 may be formed from two components, including a pulley rim 410 and a sleeve 412. The pulley rim 410 may have a relatively complex shape, such as an S-shape as shown in the cross-sectional view shown in FIG. 11c, and may be formed from a low carbon steel so that it is relatively easy to stamp the complex shape and to roll form the pulley grooves (shown at 414) that engage a belt (not shown). The sleeve 412 may be formed from a stronger and/or harder and/or tougher material so as to resist damage from engagement with the wrap spring 320. The sleeve 412 may have a generally simple cylindrical shape with a radially inner surface that may be formed (e.g. machined) to tight tolerances so as to provide consistent, predictable engagement with the wrap spring 320. The sleeve 412 may be made from any suitable material such as a 1045 carbon steel and may be heat treated.

The sleeve 412 and the pulley rim 410 may be connected to each other in any suitable way, such as by a splined connection, by a key, by brazing, by welding, by a press-fit, or by a press-fit with Loctite between the mating surfaces to strengthen the press-fit joint.

By providing a sleeve 412 that has a simple cross-sectional shape from a relatively harder material with tight manufacturing tolerances and a pulley rim 410 that has a complex cross-sectional shape from a relatively softer material and optionally, relatively looser manufacturing tolerances, the cost of the pulley 318 is kept relatively low, while providing a high degree of strength and/or hardness and/or toughness, and dimensional predictability where needed (i.e. where the pulley engages the wrap spring 320). Furthermore, by providing a separate sleeve and a separate pulley rim 410, a suitable, inexpensive pulley rim 410 may be combined with a first sleeve 412 that is selected to have the right material properties (e.g. strength, hardness, toughness) for a first application without being over engineered for the application so as to keep costs low, and the same type of pulley rim 410 may be combined with a different, more expensive but stronger sleeve 412 for a heavier duty application.

The inner surface 339 of the pulley 318 is, as shown, the inner surface of the sleeve 412. In order to improve the performance of the wrap spring 320 against this surface 339, grease or the like may be provided on the inner surface 339. In order to assist in keeping the grease in the region of surface 339 during rotation of the pulley 318, one end of the sleeve 412 may have an inwardly extending lip 412a, and a separate lip member 413 may be press-fit or permanently connected in any other suitable way to the sleeve 412. This separate lip member 413 may be referred to as a grease dam.

Slip Ring

Optionally a slip ring 428 (FIG. 11c) may be provided to assist the wrap spring 320 to contract radially away from the pulley 318 upon deenergization of the electromagnet 369. The slip ring 428 is a ring that is rotatably mounted to the retainer 358. The slip ring 428 may be made from any suitable material (e.g. a polymeric material) that permits rotational slippage with the retainer 358. The slip ring 428 may be provided in addition to or alternatively to providing the guide surfaces 420 and 424 on the carrier 348 and the retainer opening 409. The slip ring 428 is a ring that is rotatably mounted on the retainer 358. When the electromagnet 369 is deenergized, the coils of the wrap spring 348 proximate the second end 342 begin to contract radially away from the inner surface 339 of the pulley 318. As the coils 344 contract, the second end 342 of the wrap spring 320 rotates relative to the first end 340. Without the slip ring 428, as these initial coils 344 contract and engage the retainer 358, they may grip the retainer 358 so tightly that they resist further rotation and thereby prevent the rest of the coils 344 of the wrap spring 320 from contracting fully. As a result, some of the coils 344 may continue to engage the pulley 318 thereby generating an unwanted drag force on the first clutch member 316 in addition to potentially continuing to drive the pulley 318 when it is intended for the pulley 318 to be disengaged. By providing the slip ring 428, as the coils 344 proximate the second end 342 of the wrap spring 320 contract they grip the slip ring 428, however, these coils 344 can continue to rotate as needed to permit the rest of the coils 344 proximate the first end 340 to contract radially via slippage of the slip ring 428 rotationally on the retainer 358. As a result, the wrap spring 320 can contract as desired upon deenergization of the electromagnet 369.

The slip ring 428 may be similar to that described and shown in FIG. 23 of PCT patent publication WO2011156917, the contents of which are incorporated herein by reference.

While the above description constitutes a plurality of embodiments of the present invention, it will be appreciated that the present invention is susceptible to further modification and change without departing from the fair meaning of the accompanying claims.

The invention claimed is:

1. A clutch assembly, comprising:
a first, input, clutch member that is rotatable about an axis; a second, output, clutch member that is rotatable about the axis; a wrap spring having a first end, a second end and a plurality of helical coils between the first end and the second end, wherein one of the first and second clutch members is rotationally operatively connected with the first end of the wrap spring;
an armature that is rotationally operatively connected to the second end of the wrap spring;
an actuator, wherein the actuator is rotationally operatively connected to the second end of the wrap spring and the armature is rotationally operatively connected to the actuator, but is slidable axially relative to the actuator; and
an electromagnetic unit including an electromagnet, wherein energization of the electromagnet generates a magnetic flux that flows through the other of the first and second clutch members rotationally operatively connected with the wrap spring first end, through the armature and back into the electromagnetic unit,
wherein, when the first clutch member is rotating and the second clutch member is stationary, the magnetic flux draws the armature axially into engagement with the other of the first and second clutch members rotationally operatively connected with the wrap spring first end with sufficient force to frictionally cause rotation of the armature and the second end of the wrap spring relative to the first end of the wrap spring so as to radially expand the wrap spring into engagement with the other of the first and second clutch members rotationally operatively connected with the wrap spring first end thereby operatively connecting the first clutch member to the second clutch member;
wherein the armature has an axial length and a radial thickness, the axial length being greater than the radial thickness and the radial thickness being selected to permit the armature to become magnetically saturated at a selected voltage and at a selected temperature such that the magnetic force exerted between the other of the first and second clutch members and the armature is substantially constant over a selected range of operating temperatures and voltages.

2. A clutch assembly as claimed in claim 1, wherein the actuator is made from a substantially non-magnetizable material.

3. A clutch assembly as claimed in claim 1, wherein the material of the actuator has a lower density than the material of the armature.

4. A clutch assembly as claimed in claim 1, wherein the electromagnetic unit is mountable to a substantially non-magnetizable engine member.

5. A clutch assembly as claimed in claim 1, wherein the armature has a friction engagement surface that is frictionally engageable with the other of the first and second clutch members rotationally operatively connected with the wrap spring first end, and through which the magnetic flux travels from the other of the first and second clutch members rotationally operatively connected with the wrap spring first end to the armature to draw the armature into engagement with the other of the first and second clutch members rotationally operatively connected with the wrap spring first end, wherein the friction engagement surface has a surface area that is selected to limit the frictional force between the other of the first and second clutch members rotationally operatively connected with the wrap spring first end and the armature.

6. A clutch assembly as claimed in claim 5, wherein the surface area of the friction engagement surface is selected to provide a selected area of contact between the armature and the other of the first and second clutch members, and wherein the armature has a cross-sectional surface area at an axial distance from the friction engagement surface that is smaller than the surface area of the friction engagement surface and is selected to control the saturation limit for magnetization of the armature during energization of the electromagnet.

7. A clutch assembly as claimed in claim 1, wherein the electromagnetic unit has an armature flux transfer surface that is spaced radially from the armature and that has a selected amount of axial overlap with the armature, and wherein the electromagnetic unit has a second clutch member flux transfer surface that is spaced radially from the second clutch member and that has a selected amount of axial overlap with the second clutch member.

8. A clutch assembly as claimed in claim 1, wherein, when the electromagnet is not energized, the wrap spring is wrapped around a portion of the first clutch member that has a radius that is larger than a free state radius of the wrap spring, so as to generate a selected amount of preload into the wrap spring.

9. A clutch assembly as claimed in claim 1, wherein, when the first clutch member is rotating and the second clutch member is stationary, the magnetic flux draws the armature axially into engagement with the second clutch member with sufficient force to frictionally retard the armature and the second end of the wrap spring relative to the first end of the wrap spring so as to radially expand the wrap spring into engagement with the second clutch member thereby operatively connecting the first clutch member to the second clutch member.

10. A clutch assembly as claimed in claim 1, wherein, when the first clutch member is rotating and the second clutch member is stationary, the magnetic flux draws the armature axially into engagement with the first clutch member with sufficient force to frictionally drive the armature and the second end of the wrap spring rotationally about the axis relative to the first end of the wrap spring so as to radially expand the wrap spring into engagement with the first clutch member thereby operatively connecting the first clutch member to the second clutch member.

11. A clutch assembly as claimed in claim 1, wherein at least one of the first and second clutch members includes a resilient isolation member that has a first end operatively connected to an upstream member and a second end connected to a downstream member, wherein the isolation member transfers torque between the upstream and downstream members.

12. A clutch assembly as claimed in claim 1, further comprising a return spring that urges the armature axially away from the other of the first and second clutch members.

13. A clutch assembly as claimed in claim 1, wherein the armature is configured to be substantially saturated at a high end of operating temperature range and at low end of operating voltage range.

* * * * *